United States Patent [19]
Mitchell

[11] 4,092,509
[45] May 30, 1978

[54] INDUCTION HEATING APPLIANCE CIRCUIT THAT PRODUCES RELATIVELY HIGH FREQUENCY SIGNALS DIRECTLY FROM A RELATIVELY LOW FREQUENCY AC POWER INPUT

[76] Inventor: McLaren P. Mitchell, 11902 Laurel Hills Rd., Studio City, Calif. 91604

[21] Appl. No.: 576,250

[22] Filed: May 12, 1975

[51] Int. Cl.² ............................................. H05B 5/04
[52] U.S. Cl. .................................. 219/10.75; 363/160; 363/161
[58] Field of Search ................... 321/27 R, 45 R, 69, 321/66; 219/10.49, 10.75, 10.77; 363/160, 161

[56] References Cited
U.S. PATENT DOCUMENTS

| | | | |
|---|---|---|---|
| 3,268,794 | 8/1966 | Tanaka | 321/66 |
| 3,538,417 | 11/1970 | Nijhof et al. | 321/6 |
| 3,684,853 | 8/1972 | Welch et al. | 219/10.49 |
| 3,697,716 | 10/1972 | Kornrumpf | 219/10.77 |
| 3,735,237 | 9/1971 | Derby | 321/6 |
| 3,742,173 | 6/1973 | Kornrumpf et al. | 219/10.77 |
| 3,781,506 | 12/1973 | Ketchum et al. | 219/10.77 |
| 3,882,370 | 6/1975 | McMurray | 321/69 |
| 3,925,633 | 12/1975 | Partridge | 219/10.77 |

*Primary Examiner*—William H. Beha, Jr.
*Attorney, Agent, or Firm*—Maky, Renner, Otto & Boisselle

[57] ABSTRACT

The invention includes a number of high frequency inverter circuits which develop high frequency signals, preferably in the 20 KHz to 50 KHz range, for use in a work coil, which exhibits inductance and generates a magnetic flux in response to a supplied current, or in a transformer primary winding to effect a magnetic flux output in the form of a transformer action. The magnetic flux output from a work coil may be used, for example, to effect heating of a cooking utensil or the like, and the signal transmitted through a transformer may be used, for example, in electrical welding or the like. Both current fed and voltage fed inverters, which use one or more high frequency switches, such as SCR's, as well as multiplexed and stacked inverters for efficient time sharing of components, are disclosed.

21 Claims, 43 Drawing Figures

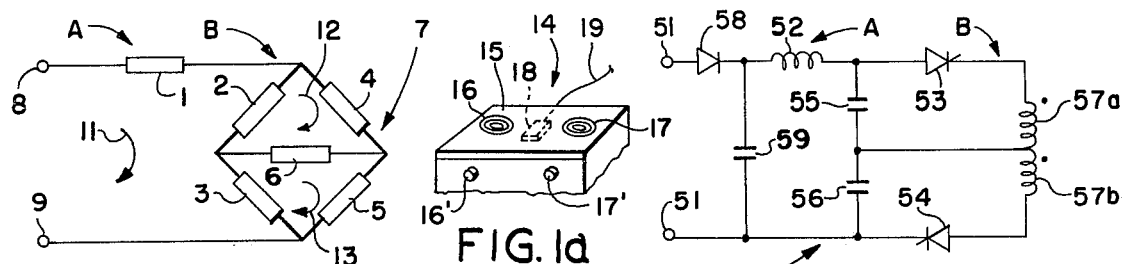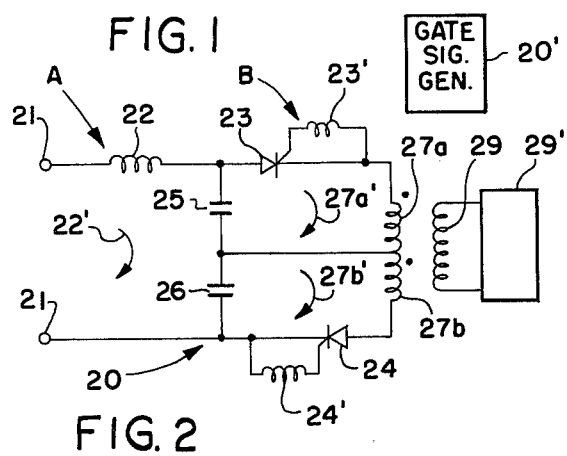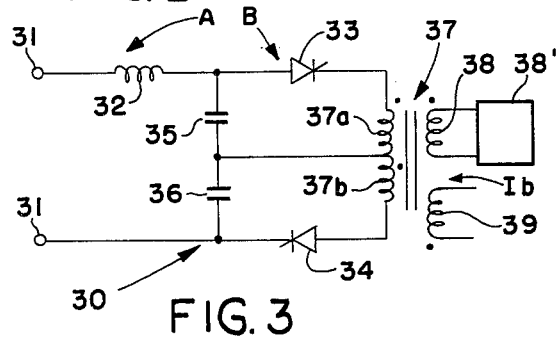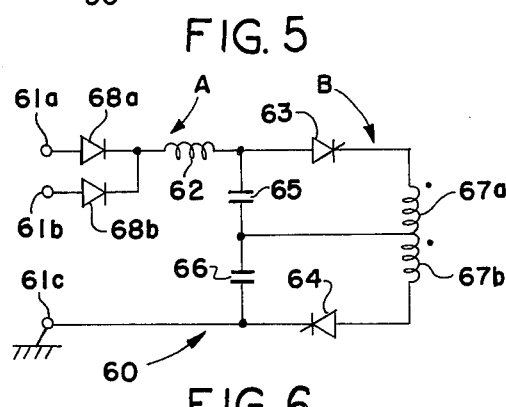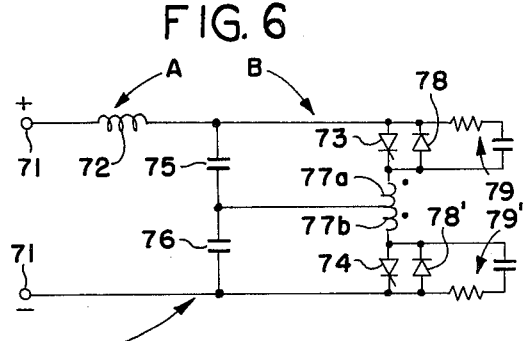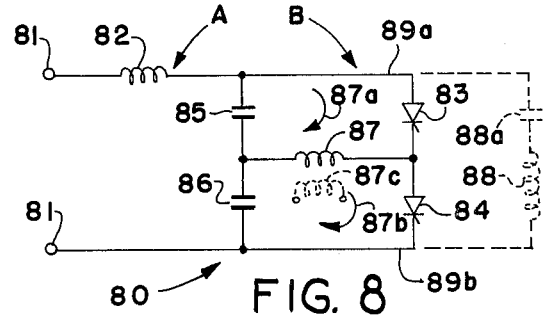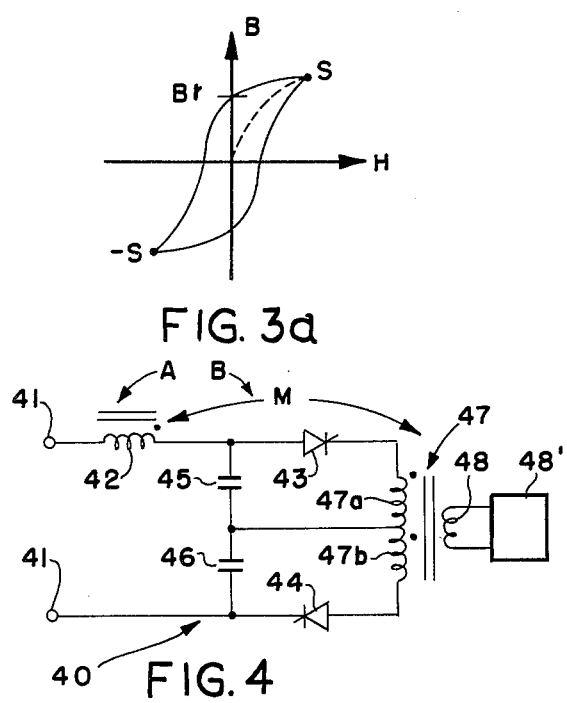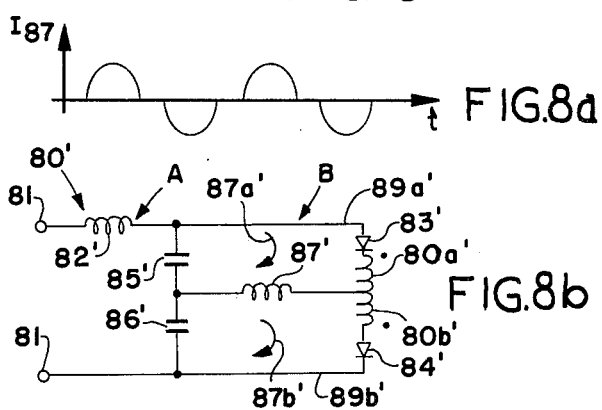

INDUCTION HEATING APPLIANCE CIRCUIT THAT PRODUCES RELATIVELY HIGH FREQUENCY SIGNALS DIRECTLY FROM A RELATIVELY LOW FREQUENCY AC POWER INPUT

BACKGROUND OF THE INVENTION

This invention relates to high frequency oscillators or inverters, and more particularly relates to oscillator or inverter circuits which develop a relatively high frequency magnetic flux and produce a transformer action which may be used to effect induction heating of a cooking utensil and which may be used for isolation and to develop power for resistance welding, or the like.

In the following description the electric circuits of the invention will be described principally with reference to use thereof for induction cooking wherein a high frequency magnetic flux generated in an inductive work coil, i.e. an inductor which generates a magnetic output signal in response to a supplied current, in an inverter circuit is applied, for example, to a magnetically responsive steel cooking utensil or the like to heat the same for cooking food therein; however, it is to be clearly understood that the described inverter circuits also may be used in other applications where high frequency signals are to be developed from relatively low frequency AC and/or DC input power and, particularly, where such high frequency signals are converted to magnetic flux signals that provide a transformer action for heating a magnetically responsive material. Moreover, in electric welding processes or the like, which require large amounts of power transmitted through a large isolation transformer when relatively low frequency signals are used, the inverters of the invention provide an advantage in the generation of high frequency signals that may be efficiently coupled through a relatively small isolation transformer to provide power for welding or the like, thus reducing the cost of such equipment.

Although the broad principle of induction heating has been known, present interest in safety, reliability and efficiency in heating and, particularly, in cooking has spurred development of modern induction heating technology. In induction heating it is desirable to avoid the generation of radio frequency interference when generating the required high frequency signals, and it is also desirable to be able to generate the high frequency signals using conveniently available relatively low cost circuit elements, such as SCR switches or the like, as opposed to those circuit elements that may require still further technological development with the appurtenant increased costs thereof. It is also desirable to time share circuit components for further system cost reduction as well as to conserve power in the inverter while being able to energize more than one inductive work coil, each of which may represent a burner or heating element of a range, oven and/or other cooking appliance.

Moreover, the frequency of the magnetic flux generated in an inductive work coil of an induction heating inverter circuit should be as high as possible, such as, for example, in the 20 KHz to 50 KHz range, and preferably closer to the upper end of the range. It has been found in induction cooking that the higher the frequency of the magnetic flux signals, the more efficient is the heating of the pan since a more concentrated heating closer to the skin portion of the pan is achieved compared to the deeper and less concentrated heating that is obtained using lower frequency signals. Also the efficiency of power transferred in a transformer action, wherein magnetic flux signals are developed in one circuit component and are transferred across an air gap or through a core to another circuit component, such as a magnetically responsive cooking utensil or the like, which forms effectively a short circuited single turn secondary, or a transformer secondary, increases with an increase in the signal frequency. It is, of course, also desirable to energize independently a plurality of inductive work coils, each of which may be a respective heating element of a range, oven and/or other cooking appliance.

Several recent patents have been concerned with induction heating. In U.S. Pat. No. 3,814,888 a high frequency electric signal is applied to an inductive work coil to generate a high frequency magnetic flux, which is coupled across an effective air gap to a magnetically responsive cooking utensil for heating the same. A basic inverter circuit which generates a high frequency AC signal from a constant input DC voltage power supply is disclosed in U.S. Pat. No. 3,047,789, and a modification of that inverter circuit is disclosed in U.S. Pat. No. 3,404,327, wherein center tapped or split inductance elements are used. In U.S. Pat. No. 3,637,970 a voltage fed oscillator for induction heating is disclosed, and an inductive work coil for cooking use is shown in U.S. Pat. No. 3,256,417.

SUMMARY OF THE INVENTION

Briefly described, the instant invention comprises a high frequency solid state oscillator or inverter that converts an input DC or relatively low frequency AC power signal to a high frequency AC signal. For convenience each of the oscillator and inverter circuits will be referred to below as an inverter and each includes a low frequency circuit portion, which comprises the input terminals and lines coupled to receive a power signal input, for example, from the 60 Hz power line of the utility company or from a DC supply, and a high frequency circuit portion, which generates from the supplied power signal input a high frequency output signal preferably on the order of from 20 KHz to 50 KHz, although signals of other frequencies may be generated; preferably, however, the output signal should be at a frequency that will provide a good induction heating effect on a magnetically responsive cooking utensil or the like.

The basic unit or model to which the inverter circuits of the invention may be reduced is a bridge circuit, and the several embodiments of the invention will be illustrated in the drawings generally in a bridge circuit configuration. A complete bridge circuit usually includes four series connected side arms and often a diagonal circuit arm. Two input power legs are usually connected to diagonally opposed nodes of the bridge. In conforming the bridge circuit model to the actual inverter circuits of the invention, each of the bridge side arms, diagonal arm and power legs may include a) an open or short circuit, b) one or more SCR's or similar switching device, c) an inductor, d) a capacitor, or e) an SCR or similar switch connected in series with an inductor. Moreover, any one or more of the above-described circuit portions also may be paralleled by a conventional RC snubber circuit, which avoids dv/dt SCR firing, and/or an anti-parallel diode in DC or rectified AC power signal supplied circuits, which limits reverse voltage on the SCR, ensures proper SCR cut off, and may provide for energy recovery when the SCR is cut off.

In constructing the inverters of the invention in accordance with the bridge circuit model using effectively perfect circuit elements, i.e. for example, inductors that exhibit no resistance or capacitance, certain constraints are followed. First, the average current through a capacitor must equal zero and, second, the average voltage across an inductor must equal zero. Third, for any given turned on condition all of the average current must flow only in a single direction through the active switch element. Fourth, there must be a continuous path for average current to flow from the input circuit to the output circuit of the bridge and, fifth, the average current path must go through one or more active switches. Average current is that current which may flow from one bridge power leg terminal connection to a power supply to the terminal connection of the other power leg. The preferred active switches of the invention are SCR's. The components of the inverters described below are considered perfect for convenience of description; however, circuits constructed using actual imperfect components, which have small inherent resistance, capacitance and/or inductance, will still operate substantially as described.

In one form of the invention a large inductor, such as a toroidal wound inductor, is connected in at least one of the input power legs to the high frequency inverter bridge circuit portion. The primary function of such large input inductor is to maintain, at least over short periods of time, a substantially constant average current flow to or from the inverter high frequency bridge circuit portion. The large input inductor is usually part of a series connected LC resonant circuit, which includes one or more capacitors connected in arms of the bridge circuit, and the ringing frequency of that first LC circuit is relatively low. In the inverter high frequency bridge circuit portion one or more inductors are found, and each such inductor forms part of a second LC resonant or ringing circuit, which usually includes one or more of the capacitors found in the first LC resonant circuit. The ringing frequency of the second LC circuit is substantially faster or higher than the low frequency of the first LC circuit. One or more SCR's or similar switches are provided with periodic gating signals, which fire the same to conduction, say at a rate of from 10 to 20 KHz or more, depending on the switching capabilities of the SCR and the resonant frequency of the LC circuit in which it is connected, to effect a short relatively high current flow through one or more of the inductors in the inverter high frequency bridge circuit portion each time a gating signal occurs, and the duration of such high current flow is determined by the ringing or resonant frequency of the mentioned second LC resonant circuit. Therefore, the large input inductor maintains a substantially constant current flow to the high frequency bridge circuit portion when considered relative to the rapidly changing currents flowing in the inductors in the second LC resonant circuits.

Moreover, the inverters of the invention which are supplied with the mentioned relative constant current supply may include only a single SCR or plural SCR's, and in the latter case the SCR's may be located on the same side of the bridge, i.e. in effective series connection relative to opposed diagonal nodes thereof; or the SCR's may be on opposite sides of the bridge facing either in the same or in opposite directions relative to the mentioned nodes. Furthermore, the invention includes several multiplexing arrangements for time sharing inverter components to energize more than one inductive work coil as well as several arrangements for stacking plural inverter circuits to obtain some component sharing while driving more than one inductive work coil. It is noted that reference to multiplexing implies that several inductors, work coils or high frequency bridge circuit portions are connected in an electrical parallel relation, and a multiplexing switch mechanism may connect effectively a single one of the foregoing at a time to be energized; on the other hand, reference to stacking implies that at least two high frequency bridge circuit portions are series connected substantially across the input power legs. Also, the size of the inductive work coil in an inverter high frequency bridge circuit portion may be changed to provide a corresponding change in the total magnetic flux generated thereby, and in making such changes, preferably the series connected capacitor would be correspondingly changed in order to maintain the high ringing frequency of the second LC resonant circuit.

In another form of the invention the inverter high frequency bridge circuit portion is provided with a substantially constant DC voltage supply, and such inverters may be of the single or plural SCR configurations; and in the latter case, the SCR's may be placed on the same or opposite sides of the bridge, in the input power leg, and so on, as mentioned above. The inductive work coils or the high frequency bridge circuit portions of the voltage fed inverters also may be multiplexed, stacked or capable of adjustment of the size of the inductor work coils in similar manner as the current fed inverters described.

Several very important advantages inure to the inverters which include high frequency bridge circuit portions that are supplied with a substantially constant current from a large input inductor. For example, the inverters may by supplied with either AC or DC power, and in the former case the large input inductor appears as a low impedance to the input 60 Hz power signal while appearing as a very high impedance to the 20 to 50 KHZ signal generated in the inverter high frequency bridge circuit portions. Therefore, such inverters may be directly connected to the power mains of the utility company without concern for high frequency feedback into the power mains, and any high frequency signal reflected by the inverter that might pass through the large input inductor to the power mains will first be smoothed by that inductor. The input inductor also provides filter protection to the inverter circuit by blocking voltage spikes which may occur on the power mains at levels as high as 1500 volts, and the constant current provided to the inverter high frequency bridge circuit portion will effect smooth overall operation thereof by effecting true ramp charging functions of respective capacitors to generate high frequency output signals in the shape of smooth sine waves, which also minimizes radio frequency interference.

Using a large input inductor to provide constant current to an inverter high frequency bridge circuit portion enabling the inverter to be directly coupled to the AC power mains eliminates the need for the expensive power diodes and large electrolytic capacitors required to provide a stiff DC voltage required to be supplied to prior art inverters, especially those used for induction heating, thus reducing the overall circuit cost while increasing its reliability because the capacitors themselves are subject to failure and often cause large start up surges which may damage other circuit elements. Yet another advantage of the instant invention in which an AC input power signal is used is that an SCR in the inverter high frequency bridge circuit portion which may latch up, i.e. lock on in a conductive condition, will be turned off each time the input AC power signal changes polarity.

In all of the circuits disclosed various additional advantages may accrue, including a reduction in the number of snubber circuits wherein a certain amount of power loss occurs; time sharing and, therefore, reduction in number of circuit components, while still obtaining maximum output energy generation; and optimization of element use, i.e. the use of relatively low frequency inexpensive SCR switches in an output energy frequency doubling circuit arrangement in place of more expensive higher frequency SCR switches without the frequency doubling circuit configuration. Other advantages of particular circuits will be mentioned below in the detailed description of the inverters.

With the foregoing in mind, a primary object of the invention is to develop a high frequency signal from a low frequency signal.

Another object of the invention is to develop a high frequency signal from a DC signal.

An additional object of the invention is to provide an oscillator or inverter circuit that produces an output in the form of a transformer action that may be used for induction heating, especially for cooking, welding or the like.

A further object of the invention is to optimize the components of an oscillator or inverter circuit to reduce the overall cost of the latter by minimizing the required specifications, such as voltage, current and the like, of one or more of the circuit components.

Still another object of the invention is to provide multiple high frequency outputs from an inverter.

Still an additional object of the invention is to share one or more components of an inverter in a multiplexed or stacked circuit configuration to produce plural high frequency output signals.

Still a further object of the invention is to enable direct connection of a high frequency inverter to low frequency AC input power mains.

Yet another object of the invention is to provide a constant current supply to a high frequency inverter.

Yet an additional object of the invention is to provide a high frequency inverter capable of operation in response to either an AC or DC input power signal.

Yet a further object of the invention is to control the power of the magnetic flux output from an inductive work coil or the like in a high frequency inverter.

These and other objects and advantages of the present invention will become more apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a bridge circuit model of a high frequency inverter;

FIG. 1a is a somewhat schematic partial isometric view of a two heating element induction heating range appliance;

FIGS. 2, 3, 4 through 8, 8b, 9 and 10 through 18 are current fed high frequency inverters;

FIG. 3a is a graph of an H-B function of a typical iron core transformer;

FIGS. 8a and 9a are graphs of current wave forms through the inductive work coils in the inverters illustrated in FIGS. 8 and 9, respectively;

DESCRIPTION OF THE PREFERRED EMBODIMENT

Figure 9:
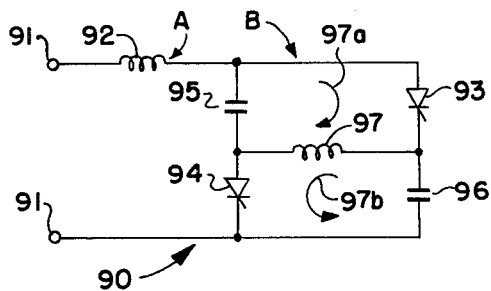

In referring to the drawings, wherein like reference numerals designate like parts in the several figures, it is first noted that each of the inverter circuits or arrangements or composites of inverter circuits in multiplexed, stacked and the like configurations has a low frequency circuit portion designated by the letter A thoughout the figures in the drawings and a high frequency circuit portion designated by the letter B. To the low frequency circuit portion A in each of the respective inverters a DC or a relatively low frequency AC, such as 50 or 60 Hz, input power signal is supplied, and in the high frequency circuit portion B, which in most instances is in the form of a four arm bridge circuit, a relatively high frequency, such as 20 to 50 KHz, signal is developed. Within the high frequency circuit portion B at least one inductor, one capacitor, and one switch element, such as an SCR, are connected, usually in the form of a circuit loop, and the effective pulse width of the high frequency signal developed in that LC circuit portion is determined by the resonant or ringing frequency of the inductor and capacitor which constitute the same. Moreover, the frequency of occurrence of such high frequency signals is determined by the frequency at which the switch element is periodically made conductive, e.g. in the preferred embodiment the switch element is one or more SCR's, and the high frequency signal occurrence is determined by the frequency at which gating signals are applied to the SCR's.

The output from the inverter circuits, described in more detail below, is preferably in the form of a magnetic flux signal, which may be coupled across an air gap to effect a transformer action for the purpose of inductively heating a magnetically responsive cooking utensil or the like. Alternatively, the inductor in which the output magnetic flux is developed may be a primary winding of an iron core transformer or the like, which has a secondary winding in which a secondary output electrical signal is developed, and which latter signal may be used in electric resistance welding processes and for other purposes in which a high frequency signal may be used.

Moreover, the inductor or inductors in the high frequency circuit portion B may serve a twofold function, i.e. as an inductive component of an LC tank or ringing circuit in series with a capacitor and as a work coil within which a magnetic flux is generated and transmitted either across an air gap to a cooking utensil or the like or through an iron core of a transformer to drive the secondary winding thereof. Alternatively, the inductor or inductors in the high frequency circuit portion B may serve only a single function, i.e. that of providing an inductance, and the work coil function may be served by a further inductive work coil, which develops the magnetic flux output signal of the inverter, that is AC coupled to a pair of normally opposite polarity nodes in the high frequency circuit portion.

Six impedances 1 through 6 in a bridge circuit model generally indicated at 7 in FIG. 1, to which all of the circuits of the present invention ultimately may be reduced, represent components of a typical high frequency inverter circuit of the invention. The model 7 has a low frequency circuit portion A and a high frequency circuit portion B. Either a DC or an AC power signal is supplied to the circuit 7 across the input terminals 8, 9 thereof, and it is noted that whenever AC power is supplied, the frequency thereof is relatively small, for example, 50 to 60 Hz, compared to the frequency of the high frequency signal, for example, 20 to 50 KHz, developed in the high frequency circuit portion B.

Each of the impedances 1 through 6 in the inverter bridge circuit model 7 may represent either a) an open or a short circuit, b) an SCR or other similar type of switch element, c) an inductor, d) a capacitor, or e) an inductor in series with an SCR or similar switch element. In determining the electrical components to insert in the respective boxes 1 through 6 of the bridge circuit model 7, the above-mentioned rules should be followed within certain obvious restrictions; for example, obviously box or impedance 1 cannot be an open circuit. A first loop current represented by the arrow 11 may flow in the circuit model 7 from one input terminal 8 through the impedance 1, through a portion of the high frequency circuit portion B to the terminal 9. Second and third loop currents indicated by the arrows 12, 13 may flow in respective current loops in the high frequency circuit portion B. In selecting electrical components for use in the bridge circuit model 7, it is to be understood that the three loop currents indicated usually flow through LC circuits, and the ringing frequency of the LC circuit through which the first loop current 11 flows is substantially smaller than the ringing frequency or frequencies of the respective LC circuits through which the second and third loop currents flow. Furthermore, in some of the circuit configurations below certain of the impedances 2 through 6 may be short or open circuits, and in some of those instances only one of the second and third loop currents 12, 13 may effectively exist.

A range cooking appliance in which the various circuits of the invention may be incorporated is generally indicated at 14 in FIG. 1a. The range 14 preferably includes a ceramic and/or glass top 15 and a plurality of induction heating coils or work coils 16, 17 located above, below, or within the top.

A power supply 18, which may include any one or a combination of the circuits described below, receives input power from the utility company via a connection to power supply means 19, and the power supply provides appropriate electric signals to the one or more work coils under selective control of knob switches and/or power controls 16', 17' to generate magnetic flux outputs useful for effecting heating in a magnetically responsive cooking utensil.

Each of the inverters illustrated in FIGS. 2 through 18 has a relatively large inductor, such as, for example, a toroidal wound inductor, connected in the low frequency circuit portion A between one of the circuit input terminals and the high frequency circuit portion B. The primary function of the large inductor, which may be on the order of from one-half to one millihenry (mh) is to provide substantially constant current to the high frequency circuit portion B. Although the input power signal supplied to the circuit may be varying, for example, at a rate of 50 to 60 Hz, the current through the input inductor may be considered effectively constant in relation to the 20 to 50 KHz signals in the high frequency circuit portion B. Therefore, the effective constant current supply to the high frequency circuit portion B will effect relatively true ramp charging functions for the components therein, which in turn provides for smooth output signals that generate a minimum of radio frequency interference. Moreover, the large input inductor, which appears as a relatively low impedance to DC or 50 to 60 Hz AC input power signals, appears as a large impedance to the high frequency signals occurring in the high frequency circuit portion B and, therefore, enables direct connection of the inverter input terminals to the power supply mains, such as, for example, the 60 Hz supply lines from the utility company.

Turning now more particularly to FIG. 2, a high frequency inverter generally indicated at 20 has a low frequency circuit portion A, which includes a pair of input terminals 21 and a large input inductor 22, and a high frequency circuit portion B, which includes a pair of SCR switches 23, 24, a pair of capacitors 25, 26 and a center tapped, preferably bifilar wound, mutually coupled inductive work coil halves 27a, 27b having a center tap 28 that forms the diagonal arm of the bridge circuit in the high frequency circuit portion. In one form of the invention the two halves of the work coil 27a, 27b provide a twofold function, i.e. to combine with a respective capacitor in forming an LC resonant circuit and to exhibit a transformer action in the generation of a magnetic flux output. The mentioned magnetic flux output may be coupled across an air gap to effect induction heating in a cooking utensil or the like, or the magnetic flux may be coupled through the iron core of a transformer to induce a current in a secondary winding thereof, which in turn may be coupled to a load.

The inverter 20 may be analogized relative to the model circuit 7 of FIG. 1, wherein impedances 1 through 6 in the latter are constituted, respectively, by the inductor 22, the capacitor 24, the capacitor 26, the SCR 23 and work coil half 27a, the SCR 24 and work coil half 27b, and the center tap short circuit connection 28 in the former. Both of the SCR's 23, 24 are located in one side, i.e. the right hand side, of the bridge circuit forming the high frequency circuit portion B of the inverter 20, and both SCR's face in the same direction, i.e. in a direction to provide for current flow only when the upper input terminal 21 is positive relative to the lower input terminal and an appropriate SCR gating signal is provided to the SCR gate terminal. Therefore, when the upper input terminal 21 is positive, a first loop current 22' will flow therefrom through a first LC resonant circuit including the input inductor 22 and capacitors 25, 26 to the lower terminal 21. A second loop current 27a' will flow through a second LC resonant circuit including the SCR 23 when conductive, work coil half 27a, and capacitor 25; and a third loop current 27b' will flow through a third LC resonant circuit including the SCR 24 when conductive, capacitor 26 and work coil half 27b. The ringing frequency of the first LC resonant circuit is much smaller than the respective preferably identical ringing frequencies of the second and third LC resonant circuits; therefore, the current through the input inductor 22 appears substantially constant to the high frequency circuit portion B.

In operation of the inverter 20, using a 0.5 mh input inductor 22 and two 3 microfarad capacitors 25, 26, when the upper input terminal 21 is positive with respect to the lower input terminal, a current flows through the input inductor 22 to charge the capacitors 25, 26 such that the upper plates of the capacitors are positive with respect to the lower plates thereof. A conventional gating signal generator 20', which is well known in the art, alternately provides gating signals to the respective pulse transformer secondaries 23' or 24' connected to the gate terminal of the SCR's 23, 24 at preferably the same frequency, which is much higher than the resonant frequency of the first LC resonant circuit but at least slightly lower than the resonant frequencies of the second and third LC resonant circuits. Therefore, when the SCR 23 is fired by an applied gating signal, the capacitor 25 will discharge through the same and through the work coil half 27a in the direction of the arrow showing the loop current 27a' in that circuit loop, and that work coil half then generates a burst of magnetic energy as part of the magnetic flux output of the inverter 20. When the lower plate of the capacitor 25 becomes more positive than the upper plate, the loop current flowing through the second LC resonant circuit 23 rings back or reverses direction as a ringing current which effects cut off of the SCR 23. Thereafter, a gating signal to the SCR 24 will fire the same to effect discharge of the capacitor 26 through the work coil half 27b, to effect loop current 27b' flow in the direction of the arrow in the third LC resonant circuit loop, and a further burst of magnetic energy is then generated by the energized work coil half. When the lower plate of the capacitor 26 becomes positive relative to the upper plate thereof, the loop current tries to reverse, which effects cut off of the SCR 24. In the meantime, current through the input inductor 22 has charged the upper plate of the capacitor 25 positive with respect to the lower plate thereof, and the SCR 23 again is ready to be fired by a further gating signal from the gating signal generator 20'.

As the above-described operation of the circuit 20 continues, the rapidly occurring bursts of magnetic energy generated by the work coil halves 27a, 27b provide a magnetic flux that may be used to heat a cooking utensil or the like. Alternatively, the work coils 27a, 27b may be wound as the primary winding of a transformer, which has a secondary winding indicated in phantom at 29, within which a high frequency current signal is induced, and the latter signal may be used to provide energy to a load which is generally indicated at 29'. The load 29' may be a resistive, capacitive, inductive or combination type load.

An important advantage residing in the inverter 20 is that although each of the SCR's 23, 24 may be fired, for example, at a frequency of 10 KHz, which will be referred to hereafter as the fundamental frequency, the effective frequency of the magnetic flux generated by the combined work coil halves 27a, 27b is 20 KHz, i.e. twice the fundamental frequency; therefore, readily available, relatively inexpensive conventional SCR's, which are capable of firing or switching frequencies of from 10 to 30 KHz, may be used to effect the generation of a high frequency magnetic flux output signal at frequencies of from 20 to 20 KHz. By using more expensive SCR's a higher frequency magnetic flux output signal may be generated. Another very important advantage of the inverter 20 when supplied with an AC power signal at the input terminals 21 is that the SCR's will conduct only when the input power signal is positive, i.e. the upper input terminal 21 is positive with respect to the lower input terminal; therefore, when the polarity of the input power signal reverses, cut off of both SCR's is guaranteed. Moreover, as will be pointed out in more detail below, a conventional RC snubber circuit may be shared between the two SCR's 23, 24 of the circuit 20 to further reduce the cost thereof and to conserve power; and in the event that DC or rectified AC input power is supplied to the terminals 21 a respective anti-parallel diode may be coupled across each SCR to limit the reverse voltage thereacross, to facilitate cutting off the same and to provide for energy recovery in the respective capacitors 25, 26. Also, the mutual coupling between the work coil halves provides a reverse voltage to the cut-off SCR each time the other SCR is fired to ensure cut off of the former.

In a preferred use of the invention the work coil halves 27a, 27b of the high frequency inverter 20 are located in a cooking appliance, such as the range 14, to constitute a single heating element 16 or 17 thereof. A magnetically responsive cooking utensil, such as a steel pan or the like, positioned over the burner and spaced therefrom by an air or other electrically non-conductive gap may be inductively heated by the high frequency magnetic flux generated in the work coil by the high frequency inverter 20. As mentioned above, the work coil halves 27a, 27b also may be used in an induction oven within which high frequency magnetic flux generated thereby is used to heat a magnetically responsive load, such as a steel pan or the like, or the magnetic flux generated by the work coil may be otherwise used, for example, in the various manners described above.

In the high frequency inverter 30 shown in FIG. 3, the low frequency circuit portion A includes a pair of input terminals 31, which may be supplied with a DC or a relatively low frequency AC input power signal, and a large input inductor 32. The high frequency circuit portion B includes a pair of SCR's 33, 34, a pair of capacitors 35, 36, and the primary windings 37a, 37b of an iron core transformer 37. The windings 37a, 37b preferably constitute a bifilar wound, mutually inductive coil, which has a center tap connection to the junction of the two capacitors 35, 36, such connection forming the diagonal of the bridge circuit in the high frequency circuit portion B of the inverter 30. A typical H-B curve for an iron core transformer, such as the transformer 37, is illustrated in FIG. 3a. The secondary winding 38 of the transformer 37 is connected to a load 38', which may be resistive, capacitive, inductive, or a combination of the same, and a bias winding 39, the purpose of which will be described in more detail below, is provided with a bias current $I_b$.

Operation of the inverter 30 is the same as described above with reference to operation of the inverter 20 in FIG. 2. The magnetic flux generated in the iron core of the transformer 37 by the primary windings 37a, 37b is of only one polarity because the direction of current flow through the primary windings is always the same. Therefore, when the inverter 30 is first energized, the magnetic flux developed in the iron core would follow the dotted line from the intersection of the axes in the graph of FIG. 3a to a point S of core saturation. If the core is not reverse driven when current through the primary windings ceases between firings of the SCR's, the flux remnant in the core will only follow a path back to the point Br on the H-B curve. It is desirable, however, to obtain maximum flux variation in the core for maximum driving of the transformer secondary winding 38; therefore, the bias current $I_b$, which is relatively small compared to the currents through the primary windings 37a, 37b, in the bias winding 39 is sufficiently large to reset the magnetics in the iron core of the transformer 37 each time the current to the primary windings goes to zero to drive the flux in the iron core to the negative saturation point $-S$ on the H-B curve of FIG. 3a. Thus, maximum flux variation will occur in the iron core of the transformer 37 for the most efficient coupling to the secondary winding 38, for each time one of the SCR's 33, 34 is fired current through the transformer primary windings will drive the iron core to saturation in one direction whereas current through the bias winding will drive the magnetics of the iron core to negative saturation each time current in the primary windings goes to zero. Maximum power transfer to the transformer secondary 38 and load 38' is thus achieved.

The efficiency of power transferred in an iron core transformer, increases with the frequency of the signals provided to the primary windings thereof, and, therefore, an advantage of the instant inverter 30, which is in addition to the above-mentioned advantages pointed out with regard to the similar inverter 20, is that a very large amount of power may be transferred to the secondary winding 38 and, ultimately, to the load 38' using a relatively small iron core.

The inverter 40 of FIG. 4 includes low and high frequency circuit portions A, B, the former including input terminals 41, across which a DC or a relatively low frequency AC input power signal may be supplied, and a large input inductor 42, and the latter including a pair of SCR's 43, 44, a pair of capacitors 45, 46 and the split primary windings 47a, 47b of an iron core transformer 47, which has a secondary winding coupled to provide a signal to a resistive, capacitive, conductive, or combination load 48'. The primary windings 47a, 47b preferably comprise a bifilar wound, mutually inductively coupled, center tapped coil, and the center tap is connected to the junction of the capacitors 45, 46 as the diagonal arm of the bridge circuit forming the high frequency circuit portion B. Moreover, the large input inductor 42 is wound on the common iron core of the transformer 47 and is mutually inductively coupled by a mutual inductance M to the other windings thereof for the purpose of resetting the magnetics of the iron core each time current in the primary windings goes to zero.

Operation of the inverter 40 is similar to that described above with reference to the inverters 20 and 30. When the SCR 43, for example, is fired by an applied gating signal, the capacitor 45 discharges through that SCR and through the primary winding half 47a into the dot thereof. When the loop tries to reverse, the SCR 43 will be cut off, and current flowing through the large input inductor 42 out of the dot to recharge the capacitor 45 will effect current flow in the windings 47a, 47b in a direction out of the dots thereof to reset the magnetics of the iron core that has an H-B curve similar to that shown in FIG. 3a. The instant circuit, therefore, provides the advantage of resetting the magnetics of the transformer 47 iron core for maximum flux variation therethrough to provide most efficient coupling to the secondary winding 48 without the need for a further transformer bias winding and bias current power supply.

Referring now more particularly to FIG. 5, an inverter generally indicated at 50, includes a low frequency circuit portion A, which comprises a pair of input terminals 51, across which a DC or a relatively low frequency AC input power signal may be supplied, and a large input inductor 52. The inverter 50 also includes a high frequency circuit portion B, which comprises a pair of SCR's 53, 54, a pair of capacitors 55, 56, and two halves of a bifilar wound, mutually inductively coupled, center tapped work coil 57a, 57b. The center tap of the work coil is connected to the junction of the two capacitors 55, 56 as the diagonal arm of the bridge circuit forming the high frequency circuit portion B. Moreover, a rectifying input circuit in the low frequency circuit portion A includes a diode 58 and a capacitor 59, which provide for half wave rectification and filtering of the input power signal to the inverter 50.

Operation of the high frequency circuit portion B of the inverter 50 to generate a high frequency magnetic flux output signal is similar to the operation described above with reference, for example, to the inverter 20 of FIG. 2. However, in the instant inverter 50 the capacitor 59 provides some degree of filtering of the input power signal and of any high frequency noise generated in the high frequency circuit portion B while the diode 58 and capacitor also provides a blocking and filtering affect to prevent high frequency noise reflected by the high frequency circuit portion B and passing through the large input inductor 52 from feeding back into the input power mains.

In the inverters 20, 30, 40 and 50 the input power signal may be either DC or relatively low frequency AC, although in the latter instance the respective inverters remain effectively dormant during the negative going portions of the supplied input power signal. The inverter 60 illustrated in FIG. 6, however, has a low frequency portion A, which has input terminals 61a, 61b, 61c, that may be connected to the two hot lines and the neutral line, respectively, of a conventional 220 volt three wire power supply provided, for example, in a home. The low frequency circuit portion A also includes a large input inductor 62, and the high frequency circuit portion B includes a pair of SCR's 63, 64, a pair of capacitors 65, 66, and two halves 67a, 67b of a bifilar wound, mutually inductively coupled work coil, which has a center tap connected to the junction of the two capacitors 55, 56 to form a short circuited diagonal arm of the bridge circuit in the high frequency circuit portion B. Moreover, a pair of diodes 68a, 68b coupled at their respective anodes to the input terminal 61a, 61b and commonly connected at their cathodes to one side of the input inductor 62 provide for half wave rectification of the respective power signals supplied to such terminals.

Since the power signal supplied between the input terminals 61a, 61c is 180° out of phase from the power signal supplied between the input terminals 61b, 61c, both such signals being approximately 110 volts, and since the diodes 68a, 68b half wave rectify each of those power signals, the effective power signal provided to the input inductor 62 is a full wave rectified signal.

Operation of the inverter 60 and the advantages of that circuit are the same as described above, for example, with reference to the inverter 20 in FIG. 2 with the exception that the inverter does not lie dormant during the negative going portions of the input power signal. Therefore, over the time required for two pulses or one full cycle of the input power signal, the inverter 60 will produce twice the total magnetic flux output compared to the magnetic flux output produced, for example, by the inverter 20 of FIG. 2, which, of course, obviously doubles the amount of power capable of transfer to a cooking utensil or the like.

The inverter 70 in FIG. 7 must be provided with a DC or a rectified relatively low frequency AC input power signal at the input terminals 71 thereof for reasons explained below. The low frequency circuit portion A includes the mentioned input terminals and a large input inductor 72. The high frequency circuit portion B includes a pair of SCR's 73, 74, a pair of capacitors 75, 76, and the two halves 77a, 77b of a bifilar wound, mutually inductively coupled, center tapped work coil. The center tap of the work coil is connected to the junction of the two capacitors 75, 76 as a short circuited diagonal arm of the bridge circuit of the high frequency circuit portion B. Across the SCR 73 are connected an anti-parallel diode 78 and a conventional RC snubber circuit 79, and an anti-parallel diode 78' and an RC snubber circuit 79' are connected across the SCR 74. Typical values for the elements of the snubber circuits are 5 ohms for the resistor and .02 microfarads for the capacitor.

Operation of the inverter 70 is substantially the same as operation of the inverter 20 of FIG. 2, although the input power must be of a single polarity due to the anti-parallel diodes. Each time current, for example, flowing through the conducting SCR 73 and the LC resonant circuit, which includes the capacitor 75 and work coil half 77a, reverses, the ringing current may pass through the diode 78 effecting approximately a 1 volt drop thereacross that ensures cut off of the SCR 73. Therefore, the diode 78 limits the reverse voltage across the SCR 73 to the 1 volt drop across the former, and the energy of the reverse or ringing current, which continues flowing through the diode 78, may be recovered in the capacitor 75. Moreover, the RC snubber circuit 79 provides an effective filter to prevent undesirable dv/dt firing of the SCR 73. The purpose and operation of the anti-parallel diode 78' and the RC snubber circuit 79' are the same as described with reference to the diode 78 and snubber circuit 79. The two halves of the work coil 77a, 77b may be coupled across an air gap to provide induction heating of a cooking utensil or the like, or they may be wound as a primary of an iron core transformer or the like to drive a secondary winding thereof.

It is noted that an RC snubber circuit may be connected in parallel with any one or more of the SCR's or other electronic switches described throughout the instant patent application to prevent dv/dt firing thereof; and an anti-parallel diode also may be connected across any one of the SCR's described herein, provided that the input power signal to such inverter is DC or rectified relatively low frequency AC power, say 50 or 60 Hz.

Referring now more particularly to FIG. 8, the low frequency circuit portion A of the inverter 80 includes a pair of input terminals 81, which may be supplied with a DC or a relatively low frequency AC power signal, and a large input inductor 82. The high frequency circuit portion B is in the form of a bridge circuit, which has a pair of SCR's 83, 84 and a pair of capacitors 85, 86 located in the four side arms thereof and an inductive work coil 87 connected in the diagonal thereof. The work coil 87 may be coupled across an air or other dielectric gap to inductively heat a magnetically responsive pan or may be coupled to a secondary 87c from which an output signal of the inverter 80 is taken. The work coil 87 is connected at one side to the junction of the two capacitors 85, 86 and at the other side to the junction of the cathode of the SCR 83 and the anode of the SCR 84.

Whenever the upper input terminal 81 is negative with respect to the lower input terminal, the inverter 80 will remain dormant; however, when the upper input terminal 81 is relatively positive, a constant current will be provided by the large input inductor 82 to charge each of the respective capacitors 85, 86 to one-half of the voltage appearing across the input terminals. A conventional gating signal generator, not shown, alternately provides the SCR's 83, 84 with gating signals to fire the same to drive the high frequency circuit portion B. When the SCR 83 is fired, the capacitor 85 discharges through that SCR and through the work coil 87, the latter and the capacitor 85 forming a first high frequency LC resonant circuit, to provide a first high frequency loop current in the direction of the arrow 87a passing through the work coil 87 in a left hand direction. When the first loop current tries to reverse, the SCR 83 will be cut off. Thereafter, a gating signal to the SCR 84 fires the same to discharge the capacitor 86 to provide a loop current in the direction of the arrow 87b through the work coil 87 in a right hand direction, and when that current begins to reverse, the SCR 84 is cut off.

The wave form of the current $I_{87}$ through the work coil 87 in the inverter 80 is illustrated in the graph of FIG. 8a. It is noted that although the effective frequency of the current through, and, accordingly, the magnetic flux generated by the work coil 87 is only equal to the fundamental frequency at which each of the SCR's 83, 84 is respectively alternately fired, the peak to peak current amplitude, and, accordingly, the effective magnetic flux variation is twice that achieved, for example, in the work coil of the inverter 20.

The inverter 80 may be modified as indicated in phantom in FIG. 8, first, by making the original work coil 87 function solely as a pure inductor, and, second, by AC coupling an inductive work coil 88 via a capacitor 88a to opposed normally opposite polarity nodes 89a, 89b of the high frequency circuit portion B. In this modified form of the inverter 80 the operation of the high frequency circuit portion B is the same as described above except that the periodically reversing current through the modified inductor 87 will also be seen as a periodically reversing current through the AC coupled work coil 88, and, in fact, the current wave form in the latter will be somewhat smoother than that in the former. Moreover, in the modified form of the inverter 80 the high frequency circuit portion B will be more stable with variation of the load to which the work coil 88 is inductively coupled.

A still further modification may be made to the inverter 80 to ensure cut off of the SCR's when they are of the type having a relatively long turn off time, and an inverter 80' incorporating such further modification is illustrated in FIG. 8b, wherein elements corresponding to those of the inverter 80 are designated with corresponding but primed reference numerals. The modification incorporated in the inverter 80' comprises a center tapped choke having mutually inductively coupled halves 80a' and 80b', each being coupled in series with a respective SCR 83', 84' and the center tap being coupled to one terminal of the work coil 87' in the diagonal of the bridge circuit. Operation of the inverter 80' is similar to that described above concerning the inverter 80, except that each time one SCR 83' or 84' is gated on, the mutually inductively coupled signal from the then energized choke coil half 80a' or 80b' into de-energized half will further ensure cut off of the other SCR.

In the above described inverters, two SCR's facing in the same direction were found on the same side of the bridge circuit constituting an inverter high frequency circuit portion B. On the other hand, in the invertor 90 of FIG. 9, which includes a low frequency circuit portion A having a pair of input terminals 91, across which a DC or a relatively low frequency AC input power signal is supplied, and a relatively large input inductor 92, the pair of SCR's 93, 94, which face in the same direction, are in respective arms on opposite sides of the bridge circuit constituting the high frequency circuit portion B. A pair of capacitors 95, 96 are also on opposite sides of the bridge circuit, in diagonally opposed side arms, and the inductive work coil 97 is connected in the bridge circuit diagonal arm.

When an AC power signal is provided to the input terminals 91 and the upper input terminal becomes negative with respect to the lower input terminal, cut off of the SCR's 93, 94 is ensured and the inverter 90 will be temporarily dormant, although at that time a slow current will rise and fall in a negative direction in the capacitors and work coil. However, when the upper input terminal 91 is positive with respect to the lower input terminal, a constant current provided by the large input inductor 92 will charge the upper plates of the capacitors 95, 96 in a positive direction through the work coil 97. A conventional gating signal generator, not shown, alternately supplies gating signals to the respective SCR's 93, 94 to fire the same. When the SCR 93 is fired, the capacitor 95 discharges to provide a loop current in the direction of the arrow 97a through the SCR 93 and through the work coil 97 in a left hand direction. Since the voltage on a capacitor cannot instantly change, when SCR 93 is turned on, the upper plate of capacitor 96 is connected to the upper plate of capacitor 95. This will drive the lower plate of capacitor 95 in the negative direction, thus providing reverse voltage across SCR 94. This unique commutation allows slow SCR's to be used in a high frequency inverter like that of FIG. 9. When that loop current 97a tries to reverse at a time determined by the resonant frequency of the high frequency LC resonant circuit formed by capacitor 95 and work coil 97, SCR 93 will be cut off. Thereafter, a gating signal to SCR 94 will fire the same to effect discharge of capacitor 96 providing a loop current in the direction of arrow 97b also in a left hand direction through work coil 97 and additionally providing turn off commutation to SCR 93. When the latter loop current 97b tries to reverse, SCR 94 will be cut off.

Figure 9A:
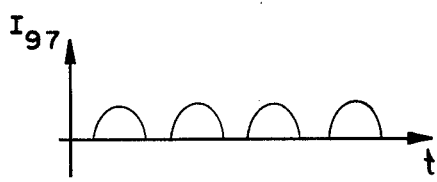

A graph illustrating the current wave form $I_{97}$ generated in the work coil 97 of the inverter 90 is illustrated in FIG. 9a. Since current through the work coil 97 flows in the same direction each time either of the SCR's 93, 94 is fired, the effective frequency of that current and, accordingly, of the magnetic flux generated thereby is twice the fundamental frequency at which each of the SCR's is fired, although the peak to peak current, and, accordingly, the total flux variation are half those parameters achieved in the inverter 80 of FIG. 8. Also, peak voltage across either SCR is half that across the SCR's, say, of inverter 130 described below.

It is to be understood that the instant inverter 90 as well as the other inverters described herein, may be modified in the manner described with reference to FIG. 8 by substituting a pure inductor for work coil 97 and AC coupling a further work coil or other load to opposed out of phase nodes of high frequency circuit portion B.

Figure 10:
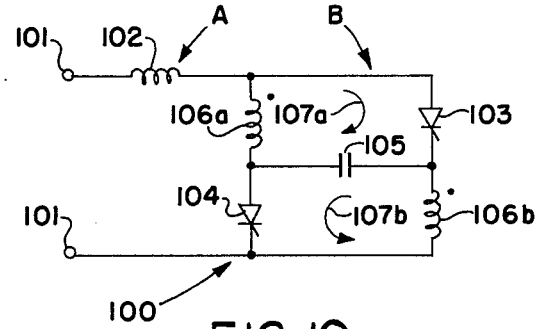

A pair of capacitors was used in each of the high frequency circuit portions B of each of the above-described inverters. In FIG. 10, however, the inverter 100, which has a low frequency circuit portion A including a pair of input terminals 101 and a large input inductor 102, has in the bridge of the high frequency circuit portion B a pair of SCR's 103, 104 coupled to opposite sides of the bridge in diagonally opposed arms thereof and a single capacitor 105, which is connected in the diagonal arm of the bridge circuit. A split work coil has two halves 106a, 106b, which are preferably bifilar wound and mutually inductively coupled as indicated in the drawing.

The input terminals 101 may be supplied with either a DC or a relatively low frequency AC input power signal, and when the upper input terminal is relatively positive, the large input inductor 102 provides a substantially constant current through the loop circuit, which includes the work coil halves 106a, 106b and the capacitor 105 to charge the left hand side of the latter positive with respect to the right hand side. Gating signals from a conventional gating signal generator may be supplied alternately to the SCR's 103, 104 to fire the same. When the SCR 103 is fired, the capacitor 105 discharges to provide a loop current in the direction of the arrow 107a through the work coil 106a; and when that loop current tries to reverse, the SCR 103 is cut off. Constant current from the large input inductor 102 again charges the left hand side of the capacitor 105 in a positive direction, and a subsequent gating signal to the SCR 104 fires the same to discharge the capacitor 105, which provides a current in the direction of the arrow 107b through the work coil 106b; and when that loop current tries to reverse, the SCR 104 is cut off.

In the inverter 100 the dot convention indicated for the two halves of the work coil 106a, 106b implies that the loop currents 107a, 107b provided upon discharge of the capacitor 105 is in a single direction in order to effect a doubling of the frequency of the magnetic flux generated thereby, relative to the fundamental frequency at which each of the SCR's 103, 104 is alternately fired—thus increasing the efficiency of the transformer action of the work coil. Moreover, another advantage of the inverter 100 is the further reduction of circuit components by providing a time sharing of a single capacitor 105. Also, when the polarity of a supplied input AC power signal is negative, the cut off of the SCR's 103, 104 is ensured.

Figure 11:
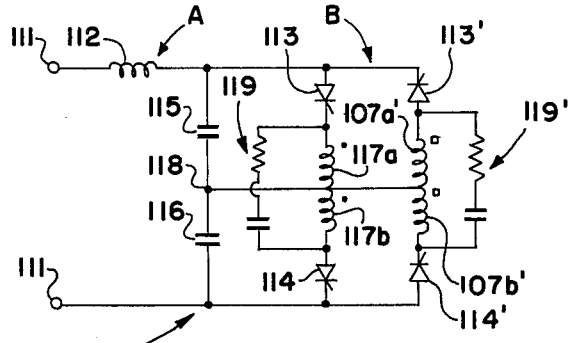

Referring now more particularly to FIG. 11, the inverter 110, which includes a low frequency circuit portion A having input terminals 111 supplied with a relatively low frequency AC power signal and a relatively large input inductor 112, has a high frequency circuit portion B that is operative over both the positive and the negative going portions of the supplied AC power signal for energization of two work coils. The high frequency circuit portion B includes a first pair of SCR's 113, 114 and a pair of capacitors 115, 116, which form a first bridge circuit operative on the positive going portions of the input power signal to energize the two halves of the first bifilar wound, mutually inductively coupled center tapped work coil 117a, 117b, as well as a second pair of SCR's 113', 114', which form a second bridge circuit with the two capacitors 115, 116 to energize the two halves of the second similar work coil 117a', 117b' during the negative going portions of the supplied AC power signal. The two center taps of the two work coils are commonly connected at 118 to the junction of the two capacitors 115, 116. A conventional RC snubber circuit 119 is connected across the two work coil halves 117a, 117b to provide dv/dt protection for the SCR's 113, 114 and another RC snubber circuit 119' is similarly connected across the work coil halves 117a', 117b' for dv/dt protection of the SCR's 113', 114'.

The work coil 117a, 117b may constitute a first heating element of an induction cooking appliance and the work coil 117a', 117b' may constitute a second heating element of the same appliance; and energization of the respective heating elements may be effected upon the respective positive and negative going portions of the supplied AC power signal at the inverter input terminals 111. Thus, for example, when the input power signal is positive, i.e. the upper input terminal 111 is relatively positive, the large input inductor 112 supplies a substantially constant current to charge the capacitors 115, 116 such that the upper plates thereof are positive with respect to the lower plates. Alternate gating signals supplied from a conventional gating signal generator, not shown, to the respective SCR's 113, 114 will effect energization of the respective work coil halves 117a, 117b in the manner described above, for example, with reference to the inverter 20 of FIG. 2. When the supplied power signal goes negative, i.e. the upper input terminal 111 becomes relatively negative, the large input inductor 112 effects a substantially constant current flow to charge the capacitors 115, 116 in the opposite direction from that previously described, and gating signals from the gating signal generator alternately supplied to the SCR's 113', 114', will effect a similar energization of the work coil halves 117a', 117b'.

Several important advantages accrue to the inverter 110. First, two different heating elements may be powered by a single input AC power signal, and the two heating element effectively share a single large input inductor 112 and a single pair of capacitors 115, 116. Also, only a single snubber circuit is necessary for dv/dt protection of a pair of SCR's. Furthermore, the inverter 110 is versatile in that the frequency at which gating signals are supplied to the SCR's 113, 114 may be different from the frequency at which gating signals are supplied to the SCR's 113', 114', and, therefore, the effective power outputs from the respective work coils may be varied independently. On the other hand, a single gating signal generator may provide simultaneous gating signals, for example, to the SCR's 113, 113' and alternately provide simultaneous gating signals to the SCR's 114, 114'; however, only the SCR's 113, 114 will fire when the input AC power signal is positive and only the SCR's 113', 114' will fire when the input AC power signal is negative.

Figure 12:
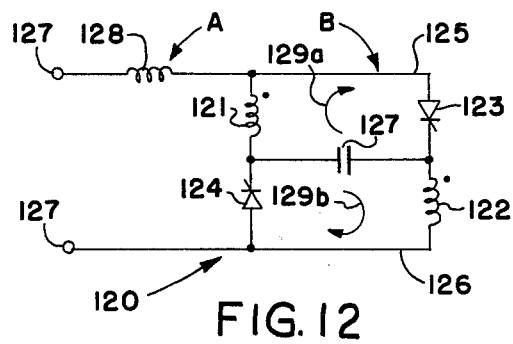

In the inverter 120 of FIG. 12 two individual work coils 121, 122 are connected for selective energization by respective SCR's 123, 124, which are also in diagonally opposed arms of the bridge circuit and face in the opposite directions, i.e. the anode of each SCR is connected to a respective one of the opposed nodes 125, 126 of the bridge circuit. Moreover, a capacitor 127 is connected in the diagonal arm of the bridge circuit. The low frequency circuit portion A of the inverter 120 includes a pair of input terminals 127 to which a relatively low frequency AC power signal is applied, and a relatively large input inductor 128.

In operation of the inverter 120 when the upper input terminal 127 is positive, the large input inductor 128 provides a relatively constant current through the inductive work coils 121, 122 to charge the left hand side of the capacitor 127 in a positive direction. Thereafter, a gating signal to the SCR 123 will cause the capacitor 127 to discharge providing a first loop current in the direction of the arrow 129a through the first work coil 121, and when the first loop current tries to reverse, the SCR 123 will be cut off. Thereafter, the constant current from the input inductor 128 will again charge the left hand side of the capacitor 127 for further discharging upon application of a further gating signal to the SCR 123. When the polarity of the input AC power signal reverses such that the lower input terminal 127 is relatively positive, the right hand side of the capacitor 127 will charge positive, and gating signals to the SCR 124 will fire the same to effect a discharge of the capacitor 127 providing a second loop current in the direction of the arrow 129b through the second work coil 122. When the loop current 129b begins to reverse, the SCR 124 is cut off and the right hand side of the capacitor 127 is again charged in a positive direction for further discharge upon application of a subsequent gating signal to the SCR 124.

A primary advantage to the inverter 120 is that two individual work coils 121, 122, which may represent two individual heating elements of a range that effect inductive heating of respective magnetically responsive cooking utensils or the like, may be individually energized during respective opposed polarity portions of the single input AC power signal, while using only a single large input inductor, a single capacitor and a single pair of SCR's. The frequency at which gating signals are supplied to one SCR does not have to be the same as the frequency at which gating signals are supplied to the other SCR; however, if desired, a single gating signal generator may be connected to supply gating signals simultaneously to both of the SCR's 123, 124, but only that SCR which has a positive voltage at its anode with respect to the voltage at its cathode will be fired by such gating signals. In other words, when the upper input terminal 127 is positive, gating signals to the SCR 124 will not fire the same. Another advantage is that when the polarity of the input AC power signal reverses, cut off of the reverse poled SCR will be ensured to avoid any latch up problems. Thus, each time the upper input terminal 127 is positive, gating signals supplied, for example, at a frequency of 20 KHz to the SCR 123 will effect a 20 KHz signal in the work coil 121, which generates a magnetic flux that may be coupled to effect induction heating of one cooking utensil or the like. Similar operation will occur with the SCR 124 and second work coil 122 when the lower input terminal 127 is positive to effect induction heating of a second cooking utensil. The inverter 120 of FIG. 12 has the added advantage that the constant current and the high frequency loop current are in opposite direction through the work coil. Therefore, if a magnetic material is used to make a transformer to couple energy to a load, the maximum use of the B-H loop will be realized.

Figure 13:
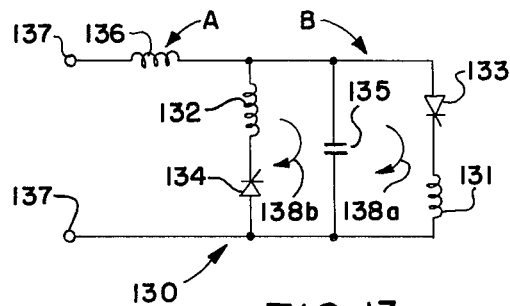

Turning now more particularly to FIG. 13, an inverter 130 includes separately energizable individual inductive work coils 131, 132 connected in series with respective SCR's 133, 134 to form the four side arms of the bridge circuit in the high frequency circuit portion B. The SCR's face in opposite directions with respect to the opposed input nodes of the bridge circuit, and a capacitor 135 is connected between the bridge circuit input nodes. The low frequency circuit portion A includes a large input inductor 136 and a pair of input terminals 137 to which a relatively low frequency input AC power signal is supplied. Thus, the inverter 130 is similar to the inverter 120 with the exception of the place in which the capacitor is connected.

In operation of the inverter 130, when the upper input terminal 137 is positive, the large input inductor 136 supplies a constant current to charge the upper plate of the capacitor 135 in a positive direction. When the SCR 133 receives a gating signal from a conventional gating signal generator, not shown, the capacitor 133 discharges to provide a first loop current in the direction of the arrow 138a through that SCR and the first work coil 131, which forms an LC circuit with the capacitor, effecting generation of a magnetic output signal. When the first loop current 138a tries to reverse, the SCR 133 is cut off and the upper plate of the capacitor 135 is then recharged in a positive direction by the constant current from the input inductor 136 for further discharge upon subsequent firing of the SCR 133. When the polarity of the input AC power signal reverses and the lower input terminal 137 becomes positive, the lower plate of the capacitor 135 will charge in a positive direction and gating signals supplied to the SCR 134 will discharge the capacitor to provide a second loop current in the direction of the arrow 138b through the SCR 134 and the second work coil 132, which forms an LC circuit with the capacitor, causing the work coil to generate a magnetic output signal. When the second loop 138b current tries to reverse, the SCR 134 will be cut off. The frequency at which gating signals may be supplied to the SCR's 133, 134 is on the order of 20 KHz or more, depending on the switching frequency capabilities of the SCR's. The advantages of the inverter 130 are similar to those described above with reference to the inverter 120.

Figure 14:
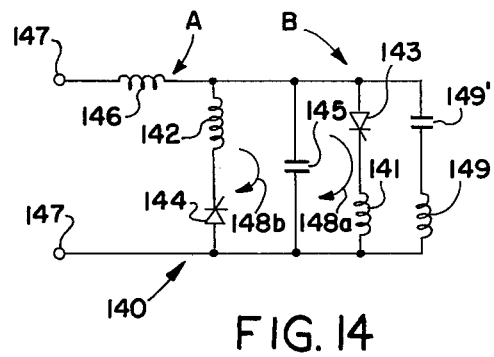

In FIG. 14 the inverter 140 is similar in structure and function to the inverter 130 of FIG. 13, except that the high frequency circuit portion B comprises a pair of inductors 141, 142, which are not work coils. A pair of SCR's 143, 144 and a capacitor 145 are connected as the corresponding elements described in the inverter 130. The low frequency circuit portion A includes a large input inductor 146 and a pair of input terminals 147 to which a relatively low frequency input AC power signal is supplied. Moreover, an inductive work coil 149 is AC coupled by a capacitor 149' to the opposed nodes of the bridge circuit between which the capacitor 145 is connected.

Operation of the inverter 140 is substantially the same as described above with respect to the inverter 130, whereby, for example, gating signals to the SCR's 143, 144 will effect discharging of the capacitor 145 to produce, respectively depending on the instant polarity of the input AC power signal, first and second loop currents in the directions of the arrows 148a, 148b through the respective inductors 141, 142. As the respective loop currents flow through the inductors 141, 142, the inductive work coil 149 also will be energized to provide an output magnetic flux, which has a relatively smooth wave form and which is generated when the input AC power signal at the input terminals 147 is either positive or negative. The smooth sine wave form provided to the work coil 149 effects optimum power transfer therefrom, and the use of an AC coupled effectively external work coil 149, relative to the inductors 141, 142 in the bridge circuit of the inverter 140 high frequency circuit portion B, is that the ringing frequencies of the LC circuit loops in the bridge circuit remain substantially independent of variations in the external load.

Figure 15:
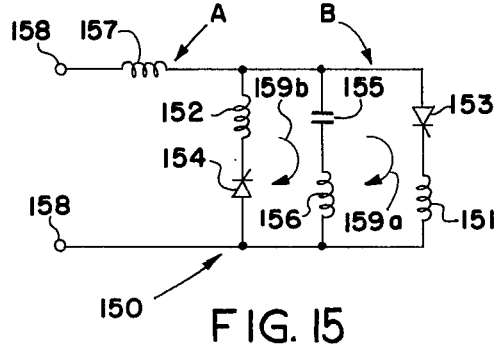

The inverter 150 in FIG. 15 is a further modification of the inverter 130 of FIG. 13, and the components and operation of both inverters are quite similar. In the inverter 150 a pair of inductors 151, 152, which are not work coils, are connected in series with respective SCR's 153, 154 in parallel circuits forming opposed side arms of the bridge circuit of the inverter high frequency circuit portion B. Connected in parallel with the two SCR and work coil series circuits is a series connected capacitor 155 and an inductive work coil 156, which completes the high frequency circuit portion B. The low frequency circuit portion A includes a relatively large input inductor 157 and a pair of input terminals 158 to which a relatively low frequency input AC power signal is supplied.

In operation of the inverter 150 when the upper input terminal 158 is positive, the large input inductor 157 supplies a relatively constant current to charge the upper plate of the capacitor 155 in a positive direction. When a gating signal from a gating signal generator, not shown, is supplied to the SCR 153, the capacitor 155 discharges to provide a first loop current in the direction of the arrow 159a through the first LC circuit loop, which includes the capacitor, the SCR 153, the inductor 151 and the work coil 156. When the first loop current 159a tries to reverse, the SCR 153 will be cut off. Thereafter, current from the input inductor 157 again charges the upper plate of the capacitor 155 in a positive direction for further discharge upon application of subsequent gating signals to the SCR 153. When the polarity of the input AC power signal reverses, the lower plate of the capacitor 155 will charge in a positive direction, and gating signals to the SCR 154 will effect discharge of the capacitor 155 to provide a second loop current in the direction of the arrow 159b through the second LC circuit loop, which comprises the capacitor, the work coil 156, the SCR 154 and the inductor 152. When the second loop current 159b tries to reverse, the SCR 154 will be cut off. Thereafter, the lower plate of the capacitor 155 will again be charged in a positive direction for subsequent capacitor discharge upon application of further gating signals to the SCR 154.

The inverter 150 provides for energization of the work coil 156 over the full wave of the input AC power signal supplied to the input terminals 158. The inverter 150 also has latch up protection for the SCR's, which are respectively cut off when the polarity of the input AC power signal reverses to the wrong direction for conduction therethrough. Another advantage of the inverter 150 is that if one of the SCR's 153, 154 should fail as an open circuit, the work coil 156 may still be energized, albeit at a reduced affective level, by the operable SCR over the appropriate polarity portion of the input AC power signal. Moreover, a single gating signal generator may be used to provide simultaneous gating signals to both SCR's 153, 154, although only one of the SCR's will be fired at a time depending on the instant polarity of the input AC power signal; and the effective power output of the work coil 156 may be simply cut in half by eliminating gating signals to one of the SCR's. The latter advantage also, of course, applies to the inverter 140.

In the bridge circuit forming the high frequency circuit portion B of each of the above-described inverters at least one pair of SCR's was used to develop high frequency signals in one or more work coils. The inverter 160 illustrated in FIG. 16 uses only a single SCR 161. The inverter 160 receives a DC or a rectified relatively low frequency AC power signal at the input terminals 161 thereof in the low frequency circuit portion A, which also includes a large input inductor 162. The high frequency circuit portion B of the inverter includes a work coil 163, the SCR 164 and a capacitor 165. An anti-parallel diode 166 and a conventional RC snubber circuit 167 are connected across the SCR 164.

In operation of the inverter 160, constant current provided by the large input inductor 162 charges the upper plate of the capacitor 165 in a positive direction. When a gating signal from a gating signal generator, not shown, is supplied to the SCR 164, the capacitor 165 will discharge to provide a loop current in the direction of the arrow 168 around the LC circuit loop, which includes the capacitor, the SCR and the work coil 163. When the loop current 168 reverses, it will flow through the anti-parallel diode 166 effecting approximately a 1 volt drop thereacross, which causes the SCR 164 to cut off, and the energy of the reverse current flow through the anti-parallel diode may be recovered in the capacitor 165. Each time the SCR 164 is fired, the current through the work coil 163 will effect generation of a burst or an oscillation of magnetic energy therefrom, and that magnetic energy may be coupled, for example, across an air gap to a magnetically responsive cooking utensil or the like for induction heating of the same.

Figure 17:
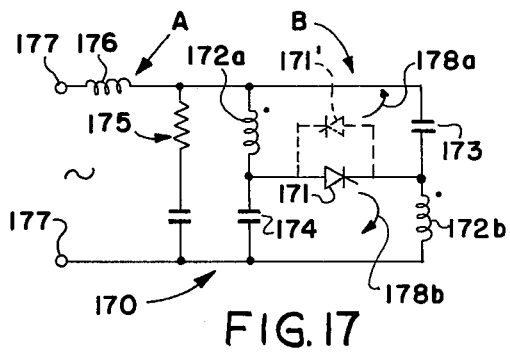

The inverter 170 illustrated in FIG. 17 uses a single SCR 171 located in the diagonal arm of the bridge circuit of the inverter high frequency circuit portion B for effecting energization of the two halves 172a, 172b of a bifilar wound mutually inductively coupled work coil located in diagonally opposed arms of the bridge. A pair of capacitors 173, 174 are located in the other diagonally opposed arms of the bridge, and a conventional RC snubber circuit 175 is connected in parallel with the bridge. The low frequency circuit portion A of the inverter 170 includes a relatively large input inductor 176 and a pair of input terminals 177 to which a DC or a relatively low frequency AC signal may be supplied.

Typical exemplary values for the components of the inverter 170 are 1 mh for the input inductor 176, 1 microfarad for each of the capacitors 173, 174, 30 microhenries for each of the work coil halves 172a, 172b, and 5 ohms for the resistor and 0.02 microfarads for the capacitor in the RC snubber circuit 175. In operation of the inverter 170 when the upper input terminal 177 is positive, the input inductor 176 provides a relatively constant current to charge the two capacitors 173, 174 in parallel. When a gating signal from a conventional gating signal generator, not shown, is supplied to the SCR 171, the latter is fired to discharge the capacitors effectively in series. The capacitor 173 provides a first loop current in the direction of the arrow 178a through the work coil half 172a in a direction into the dot, and the capacitor 174 provides a second loop current in the direction of the arrow 178b through the work coil half 172b in a direction into the dot. Since both work coil halves are mutually inductively coupled and preferably are positioned to provide magnetic flux to heat a common load, maximum power will be transferred to the latter. The resonant frequency of each of the respective LC resonant circuits through which the first and second loop currents flow are preferably the same; and when the two loop currents try to reverse, the SCR 171 will be cut off. After the SCR 171 has been cut off, the capacitors 173, 174 again charge by the constant current from the large input inductor so that the upper plates thereof become relatively positive, and a further gating signal to the SCR 171 will again fire the same to discharge the capacitors in the manner described above.

The frequency at which gating signals are supplied to the SCR 171 will be on the order of approximately 20 KHz, depending on the switch frequency capability of the SCR, and when the polarity of the input AC power signal to the input terminals 170 reverses, the inverter 170 will lie dormant. On the other hand, an anti-parallel SCR 171' may be coupled across the SCR 171 to provide for operation of the inverter 170 over the full wave of a supplied input AC power signal, of if a bidirectional switch, such as a triac, has a sufficiently fast switching capability, it may be substituted for the back-to-back SCR's. Moreover, if desired, a pure inductor may be substituted for one of the work coil halves 172a, 172b, and magnetic flux will then be generated only by the other work coil half upon energization thereof. Although the SCR 171 must be capable of handling a higher current than most of the pairs of SCR's used in the above-described inverters and, therefore, would probably be more expensive, the cost of such a single more expensive SCR may ultimately be less than the cost for a pair of lower current rated SCR's used in such above-described inverters. Additionally, if a diode were substituted for the SCR 171' and not an SCR and the input power signal were DC or rectified AC, then the reverse current flow of the loop currents 178a and 178b would return the stored energy back to the capacitor 173 and 174, while at the same time providing reverse voltage of about 1 volt, i.e. the voltage drop across the diode, for turn off of SCR 171.

Figure 18:
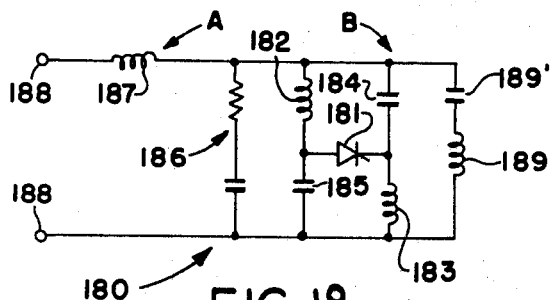

The inverter 180 illustrated in FIG. 18 is similar to the inverter 170 of FIG. 17. The high frequency circuit portion B of the inverter 180 includes a single SCR 181 connected in the diagonal arm of the bridge circuit, a pair of inductors 182, 183, which are not work coils, and a pair of capacitors 184, 185, each being located in a respective side arm of the bridge circuit of the high frequency circuit portion. A conventional RC snubber circuit 186 is connected across the bridge circuit for dv/dt protection of the SCR, and the inverter low frequency circuit portion A includes a large input inductor 187 and a pair of input terminals 188 across which a DC or a relatively low frequency AC power signal may be supplied. Also connected across the high frequency circuit portion B is an inductive work coil 189, which is AC coupled to the bridge circuit by a capacitor 189'.

Operation of the inverter 180 is substantially identical to the operation described above with respect to the inverter 170, except that each time the SCR 181 is fired and the capacitors 184, 185 discharge in series, twice the voltage provided across the respective inductors 182, 183 is supplied to drive the work coil 189, which obviously provides four times the effective driving power for the work coil relative to that driving the individual work coil halves in the inverter 170. Another advantage of the inverter 180 is that the parallel charging of the capacitors 184, 185 minimizes the forward voltage applied to the SCR 181, although twice that forward voltage is provided to drive the work coil 189 when the SCR is fired.

In each of the above-described inverters a relatively large input inductor is connected between at least one of the inverter input terminals and the high frequency circuit portion B to provide a relatively constant current supply to the latter compared to the rapidly changing currents developed therein. In other words, relative to the 20 to 50 KHz currents developed in the work coils to effect a transformer action therein, the DC current or the 50 or 60 Hz AC current supplied through the large input inductor may be considered wholly or at least relatively constant over one or more of the oscillatory cycles of such high frequency currents. In the above-mentioned recent patents concerned with induction heating the various circuits thereof are supplied with a stiff DC voltage supply, which usually requires one or more expensive and bulky power diodes and large electrolytic capacitors at the inverter input. I have applied several of the above-described component optimizing principles for inverter circuits not only to current fed inverters but also to the voltage fed inverters illustrated in FIGS. 19 through 24 of the drawings. Although many of the above-described current fed inverters may be supplied with a DC or a relatively low frequency AC power signal, in the latter case such inverters being effectively AC to AC converters, the voltage fed inverters described below with reference to FIGS. 19 through 24 require a DC or rectified relatively low frequency AC power signal, and, preferably, such a power signal should be provided from a relatively stiff voltage supply.

Figure 19:
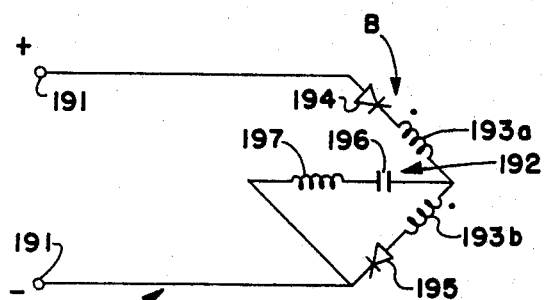
FIGS. 19, 20, 21, 22, 23 and 24 are voltage fed high frequency inverters.

Turning now more particularly to FIG. 19, a voltage fed inverter 190 has a pair of input terminals 191 across which a DC power signal is supplied to a bridge circuit 192 forming the high frequency circuit portion B. The left hand upper side arm of the bridge circuit, as illustrated, is an open circuit. The bridge circuit 192 also includes two halves 193a, 193b of a bifilar wound, mutually inductively coupled, center tapped commutating coil, a pair of SCR's 194, 195 coupled at opposed ends of the coil halves, and a capacitor 196 connected between the center tap of the coil halves and through a work coil 197 to the cathode of the SCR 195 and the negative input terminal 191. A related oscillator circuit is disclosed by Bedford in *Principles of Inverter Circuits* (John Wiley & Sons, 1964) at page 137, in which a resistive load coupled in series with the capacitor is driven at high frequency. In the Bedford circuit there is no inductive work coil which provides a magnetic flux output in a transformer action, for example, for effecting induction heating of a cooking utensil or the like.

In operation of the inverter 190 when supplied with a DC power signal from a stiff voltage source across the input terminals 191, a gating signal from a gating signal generator, not shown, is provided to the SCR 194 firing the same to provide a first loop current through a first LC circuit, which includes the coil half 193a, work coil 197, and the capacitor 196, to charge the right hand side of the capacitor in a positive direction. When the current in that first LC circuit tries to reverse, which depends on the resonant frequency of the first LC circuit, the SCR 194 will be cut off. Thereafter, a gating signal to the SCR 195 will discharge the capacitor 196 through a second LC resonant circuit, which includes the coil half 193b, work coil 197, and capacitor 196, and when the second loop current through the second LC resonant circuit tries to reverse, the SCR 195 will be cut off. Each time current flows through the work coil, a half sine oscillation of magnetic energy is generated thereby, and such magnetic energy may be used, for example, in a range appliance to effect induction heating of a magnetically responsive cooking utensil or the like.

One advantage of the inverter 190 is that the mutual coupling between the respective coil halves 193a, 193b facilitates and ensures cut off of one SCR when the opposite SCR is fired. Moreover, another advantage of the instant inverter is that only a single capacitor is required for commutation of the SCR's.

Figure 20:
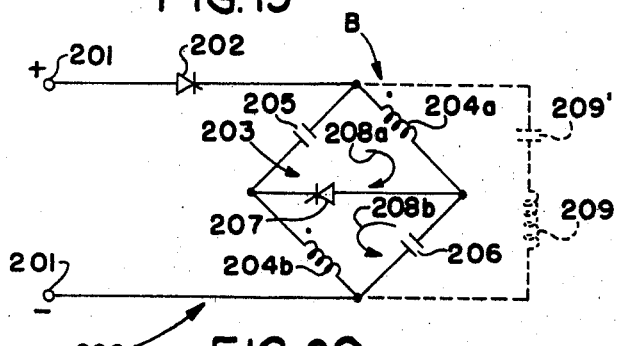
Figure 20D:
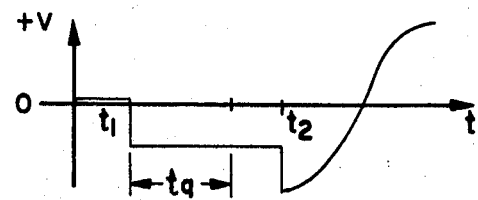
FIG. 20a is a graph of the voltage wave form across the input switching SCR in the inverter illustrated in FIG. 20.

The voltage fed inverter 200 in FIG. 20 has a pair of input terminals 201 across which a DC power signal is supplied, and a first SCR 202 connects the positive input terminal to one side of the bridge circuit 203 in the inverter high frequency circuit portion B. The bridge circuit 203 includes two halves of a bifilar wound, mutually inductively coupled work coil 204a, 204b, a pair of capacitors 205, 206, which are in respective arms of the bridge, and a second SCR 207 which is connected in the diagonal arm of the bridge.

In operation of the inverter 200 the first SCR 202 is supplied with a gating signal from a conventional gating signal generator, not shown, to fire the same, which provides for parallel charging of the capacitors 205, 206 such that the upper plates thereof become relatively positive. Thus, a first charging circuit for the capacitor 205 runs from the positive input terminal 201, through capacitor 205 and work coil 204b, to the negative input terminals 201; and a similar parallel charging circuit for the capacitor 206 runs through the work coil half 204a and the capacitor 206. The capacitor 205 and work coil 204b form a first LC resonant circuit, and the capacitor 206 and work coil half 204a form a second LC resonant circuit. The charging currents effect generation of magnetic flux in the work coils, and when the parallel charging currents through such LC resonant circuits try to reverse, the SCR 202 is cut off. Moreover, the respective voltages on the capacitors 205, 206 will then maintain the first SCR 202 cut off.

When the second SCR 207 is fired by a gating signal supplied from a gating signal generator, not shown, the two capacitors 205, 206 discharge through the same and through the respective work coils 204a, 204b to effect generation of magnetic energy from each of the same, and the direction of the discharge loop current flow through each work coil half is indicated, respectively, by the arrows 208a, 208b. When the respective loop currents 208a, 208b, try to reverse, the SCR 207 is cut off and is held cut off by the voltage on the capacitors. A further cycle of operation of the inverter 200 will follow when a subsequent gating signal is supplied to the first SCR 202. The magnetic flux generated by the work coils may be coupled to a cooking utensil or the like for inductively heating the same.

The inverter 200 may be modified as indicated in phantom in FIG. 20 by substituting pure inductors for each of the work coil halves 204a, 204b and by AC coupling a further work coil 209 by a coupling capacitor 209' to opposed out of phase nodes of the bridge circuit 203. A particular advantage to the instant modification is that the capacitors 205, 206 are charged in parallel, which maintains the reverse voltage on the SCR 207 relatively low; however, when the SCR 207 is fired, the capacitors 205, 206 effectively discharge in series to provide twice the driving voltage to the work coil 209 compared to the above-described driving or energizing signal provided to the work coil 204a, 204b.

A further advantage of the inverter 200 is illustrated with reference to the graph of the voltage wave form across the SCR 202 shown in FIG. 20a. It is noted that for proper inverter operation the SCR 202 must be cut off when the SCR 207 is fired, and cut off can only be ensured when the voltage across the SCR 202 is driven in a reverse direction for a sufficiently long time at least equal to the inherent required turn off time $t_q$ of the SCR. Referring to the graph of FIG. 20a, when the SCR 202 is conducting, the voltage thereacross is approximately zero, as is shown at the left hand portion of the graph. When the charging currents to the capacitors 205, 206 try to reverse or to ring back, the SCR 202 is initially cut off and the voltage thereacross goes negative, as is indicated at the time $t_1$ on the graph; and the voltage on the capacitors 205, 206 maintain the SCR voltage negative until the SCR 207 is fired, which occurs at $t_2$ on the graph. The increment of turn off time $t_q$ for the SCR 202 is indicated beginning at the time $t_1$, and it can be seen that the firing of the SCR 207 occurs at a point in time beyond that increment. Moreover, when the SCR 207 is fired, the instantaneous voltage across the SCR 202 is driven further negative, and as the capacitors 205, 206 discharge in their respective loops, the voltage on the SCR 202 rises in the positive direction to a level preparatory for further firing thereof. Thus, not only do the capacitors maintain a sufficient reverse voltage on the SCR 202 for a duration longer than the turn off time $t_q$ thereof, but also the circuit arrangement provides for application of an increased reverse voltage to the SCR 202 whenever the SCR 207 is fired further to ensure cut off of the former SCR when the latter is fired.

Figure 21:
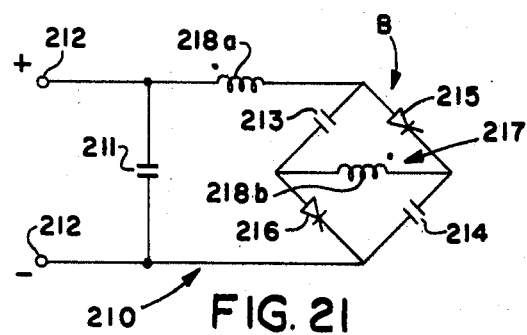

In the inverter 210 of FIG. 21 the large electrolytic capacitor 211 that provides a stiff DC voltage source is illustrated in connection with the input terminals 212. The inverter 210 includes a pair of capacitors 213, 214 and a pair of SCR's 215, 216, which are connected in respective arms of the bridge circuit 217. The work coil of the inverter 210 is in the form of two mutually inductively coupled halves 218a, 218b of a split, bifilar wound work coil.

Initially when the two SCR's 215, 216 are cut off, the capacitors 213, 214 are charged through the work coil such that the upper capacitor plates become positive. When the SCR 215 is fired, current will now flow through the work coil half 218a and through the SCR 215 to charge the upper plate of the capacitor 124 positively. The turning on of SCR 215 will also provide a negative commutation voltage to be applied to SCR 216 via the voltage across capacitor 213; thus, a high frequency of operation is possible without going to faster rated SCR's. Moreover, the capacitor 213 will discharge to provide a first loop current in a first LC resonant circuit loop, which includes that capacitor and the work coil half 218b. The magnetic energy generated by the two work coil halves 218a, 218b at that time is additive to increase the effective power output of the work coil provided, for example, to effect induction heating of a cooking utensil or the like. When the loop currents try to reverse, the SCR 215 will be cut off. Thereafter, a gating signal supplied to the SCR 216 will fire the same to discharge the capacitor 214 to provide a second loop current in a second LC resonant circuit loop which includes that capacitor and the work coil half 218b; at this time a current also will flow via work coil half 218a and capacitor 213, and generate a further burst of additive magnetic energy in the work coil. When the second loop currents try to reverse, the SCR 216 will be cut off.

Figure 22:
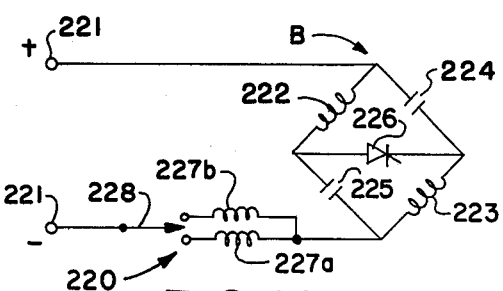

Another voltage fed inverter 220 is illustrated in FIG. 22. The inverter 220 has a pair of input terminals 221 across which a DC voltage power signal is provided, and the high frequency portion B of the circuit includes a pair of capacitors 224, 225 and a pair of inductors 222, 223, which are connected in the four side arms of a bridge circuit. Moreover, a single SCR 226 is connected in the diagonal arm of the bridge circuit. At the negative side of the bridge circuit are connected a pair of inductive work coils 227a, 227b, which may be individually connected by a switch 228 to the negative input terminal 221.

The switch 228 may be in the form of a simple selector switch that may be manually moved into connection with either one of the work coils 227a, 227b for energization thereof by high frequency currents developed in the inverter 220; alternatively, the switch 228 may be in the form of a multiplexing switch, such as a mechanical switch or, for example, a pair of triacs which may be respectively fired to conduction by applied gating signals. The multiplexing switch, therefore, rapidly cyclically changes connection of one of the work coils to connection of the other of the work coils to the inverter in order to effect a time sharing of the high frequency signals developed in the bridge circuit of the inverter 220. Each of the work coils 227a, 227b may represent a different respective heating element of a range appliance; and although only two such coils or heating elements are shown, as many as four or more may be individually selected and/or multiplexed for high frequency energization in the instant inverter 220, as well as in the inverters 230 and 240 described below.

In operation of the inverter 220, assuming that the switch 228 is in connection only with the work coil 227a, the capacitors 224, 225 are charged in parallel from the positive input terminal 221 through the respective large inductors 222, 223 and through the work coil 227a to the negative input terminal 221. When the SCR 226 is turned on, the capacitors 224, 225 discharge in series, and current will flow through the work coil 227a in a direction to the right, as shown in the drawing. Moreover, when the respective LC resonant loop circuit of work coil 227a and capacitors 224, 225 in series in the bridge circuit provides a reverse or ring back current, the SCR 226 will be cut off, and the capacitors 224, 225 again will charge from the current from inductors 222, 223 such that the upper plates thereof will become positive. Of course, each time current flows through the work coil 227a, magnetic flux generated thereby may be coupled to a magnetically responsive cooking utensil or the like for inductively heating the same.

If the switch 228 is moved into connection with the work coil 227b, operation of the inverter 220 will be the same as described above with the exception that magnetic flux will then be generated only by the latter work coil. If the switch 228 is in the form of a multiplexing switch, such as a mechanical switch that is in connection with the work coil 227a, say for one-half second, and is then in connection with the work coil 227b, say for the next half second, and so on, then magnetic flux will be generated alternately in each of the work coils which may be, for example, two different respective burners of a range appliance. Whether the switch 228 is a selector or multiplexing type switch, the current through the work coils will be in a direction to the left, as shown in the drawing, each time the capacitors 224, 225 are charging and in a direction to the right each time the capacitors are discharging; therefore, a push pull current effect is provided to those work coils, and relatively large peak to peak current and magnetic flux variations will accordingly occur.

Figure 23:
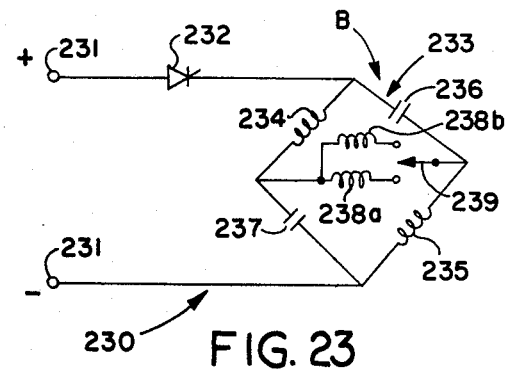

In FIG. 23 the inverter 230 is connected to a pair of input terminals 231, to which a DC power signal is supplied, and an SCR 232 is connected between the positive input terminal 231 and the positive side of the bridge circuit 233 in the high frequency circuit portion B of the inverter. The bridge circuit 233 includes a pair of inductors 234, 235 and a pair of capacitors 236, 237, each being connected in a respective diagonally opposed side arm of the bridge, and a pair of work coils 238a, 238b are selectively connectable in the bridge circuit diagonal arm by a switch 239, which may be in the form of a selector switch or a multiplexing switch as described above with reference to the switch 228 in the inverter 220 of FIG. 22. The inductors 234, 235 are preferably relatively large to provide in effect a constant current flow for charging the capacitors 236, 237 whenever the SCR 232 is fired.

In operation of the inverter 230, assuming that the switch 239 is in connection with the work coil 238a, a gating signal generator, not shown, supplies gating signals to the SCR 232 to fire the same to provide a current flow initially to the capacitor 236, work coil 238a, and capacitor 237 to the negative input terminal 231. Also, current will flow in the inductors 234 and 235. When the capacitors 236, 237 become charged and the current through the same and the work coil 238a, which form a first LC resonant circuit tries to reverse, the SCR 232 is cut off. At this time the current flowing in the inductors 234, 235 will now flow into the capacitors 236, 237, thus charging them up in the negative direction. Each time a gating signal is supplied to the SCR 232 the described operation repeats, and the magnetic flux from the work coil may be used to heat a magnetically responsive cooking utensil or the like.

An advantage to the inverter 230 is that only a single SCR is required. Another advantage is that of the built-in safety or fail safe feature which permits inverter operation even if one of the capacitors 236, 237 should fail as a short circuit in which case the other capacitor would continue to operate although the LC time constant of the bridge may then change somewhat. Thus, operation of the inverter 230 is ensured even though a failure occurs in the circuit component which is most likely to fail. It is to be understood that if the switch 239 were a selector switch, it may be switched into connection with the coil 238b to effect energization thereof, and if the switch were a multiplexing switch, each of the work coils 238a, 238b may be alternately energized while sharing the other components of the inverter 230.

Figure 24:
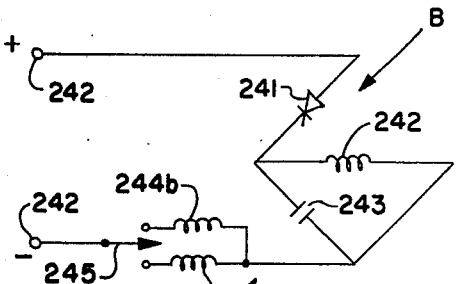

A further voltage fed oscillator 240, which uses a single SCR 241, is illustrated in FIG. 24. The oscillator 240 is connected across a pair of input terminals 242 to which a DC voltage power signal is supplied, and the high frequency portion B of the inverter includes a parallel connected inductor 242 and capacitor 243, which are connected at one node or junction to the cathode of the SCR 241 and at their other node or junction to one side of each of a pair of work coils 244a, 244b. The other side of each of the work coils is selectively connectible by a switch 245 to the negative input terminal 242. The switch 245 may be a selector switch or a multiplexing switch as described above in the inverters 220 and 230.

In operation of the inverter 240, assuming that the switch 245 is in connection with the work coil 244a, a gating signal supplied to the SCR 241 from a gating signal generator, not shown, will fire the same to effect charging of the capacitor 243 such that the upper plate thereof becomes relatively positive while current is provided in a left hand direction through the work coil 244a. Also, current will flow in the right hand direction of the inductor 242. When the current through the first LC resonant circuit, including the capacitor 243 and work coil 244a reverses, the SCR 241 is cut off. Reverse or ring back current continues to flow through the inductor 242 into the capacitor 243. The capacitor 243 and the inductor 242 form a second LC resonant loop circuit, the frequency of this loop being lower than the frequency of the first loop, and the current flowing therein will charge the capacitor to the proper polarity for the next firing of the SCR 241. Each time current flows through the work coil 244a a magnetic signal is generated, which signal may be coupled to a magnetically responsive cooking utensil or the like for inductively heating the same.

A further advantage to the multiplexing arrangements illustrated in the inverters 220 and 240 of FIGS. 22 and 24, respectively, is that one side of the selector or multiplexing switch is connected effectively to a ground potential, i.e. at the negative input terminal of the inverter, which provides a very important safety feature thereof.

Figure 25:
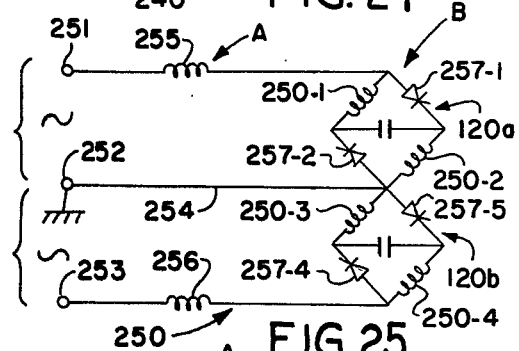
FIGS. 25 through 39 are composite high frequency inverters which provide for high frequency energization of more than one inductive work coil.

The several composite inverters illustrated in FIGS. 25 through 38 include combinations of various ones of the above-described high frequency inverters to effect energization of one or more inductive work coils, which are preferably in an induction cooking appliance and which form respective heating elements thereof. Referring initially to FIG. 25, the composite inverter 250 includes upper and lower high frequency inverter portions 120a, 120b each of which is identical with the inverter 120 described above with reference to FIG. 12. The composite inverter 250 is connected at its input terminals 251, 252, 253 to the three wires usually provided from the utility or power company to a home. Across the hot input terminal 251 and neutral input terminal 252 is a first AC power signal, for example, at 110 volts, and across the neutral input terminal 252 and hot input terminal 253 is a second AC power signal, for example, 110 volts, which is 180° out of phase with respect to the first. A pair of relatively large input inductors 255, 256 which provide substantially constant current to the high frequency inverter portions 120a, 120b are connected in the respective hot input lines to the latter, and the neutral input terminal 252 is connected to the junction 254 of the two high frequency inverter portions. Four work coils 250-1 through 250-4 in the composite inverters 250, may be individually energized at respective power levels depending on the application of gating signals to the respective SCR's 257-1 through 257-4.

Whenever the input terminal 251 is positive with respect to the input terminal 252, gating signals to the SCR 257-1 will effect energization of the work coil 250-1 in the manner described above with reference to the inverter 120 of FIG. 12. Moreover, whenever the input terminal 251 is negative with respect to the input terminal 252, gating signals to the SCR 257-2 will effect energization of the work coil 250-2. Similar operation will occur for the SCR's and work coils in the high frequency inverters 120b, depending on the polarity of the AC power signal supplied across the input terminals 252, 253. As noted above, the frequency at which gating signals are supplied to the respective SCR's need not be the same for any two SCR's. The instant composite inverter 250 provides an efficient circuit arrangement for energizing four work coil burners of a domestic cooking appliance independently of each other using only two input inductors, four SCR's, and two capacitors, as well as any snubber circuits which may be found necessary to avoid dv/dt firing of the SCR's.

It is important to consider the control of power in the form of total magnetic flux generated by any one work coil 250-1 through 250-4 of the composite inverter 250, as well as for any work coil used in the inverter circuits of the instant invention. A first technique for controlling the power output of, say, the work coil 250-1 in the composite inverter 250 is to control the effective input voltage to the high frequency inverter 120a when the input terminal 251 is positive with respect to the input terminal 252. A conventional adjustable clipping type circuit may be used for this purpose, and it will be understood that by reducing the positive voltage supplied across the input terminals 251, 252, the voltage to which the capacitor in the high frequency inverter 120a is charged will also be reduced to effect a corresponding reduction in the power output of the work coil 250-1. Similar power control arrangements may be provided for each of the work coils, for example, in the composite inverter 250.

A second method for achieving power control of the magnetic flux generated, say, from the work coil 250-1 in the composite converter 250 is to control the frequency at which gating signals are supplied to the SCR 257-1 by the gating signal generator, not shown. This method of power control may be readily effected by using a variable frequency pulse signal generator as the gating signal generator, and, of course, when the frequency of gating signals increases, the effective power output of the work coil also increases. Of course, the frequency at which the gating signals are supplied to the SCR should be at least slightly less than the effective ringing frequency of the LC resonant circuit in which the SCR and work coil are connected. Using this technique for power control the frequency at which gating signals are supplied to each of the respective SCR's in the composite inverter circuit 250 also may be respectively independently adjustable.

A third technique to achieve power control of the effective magnetic flux generated, for example, by the work coil 250-1 in the composite inverter 250 is to vary the effective duty cycle during which gating signal pulses are supplied to the SCR 257-1 while maintaining relatively constant the frequency at which the gating signals are generated. Thus, for example, ten successive gating signals may be sequentially provided to the SCR 257-1 with each gating signal effecting a corresponding energization of the work coil 250-1. Therefore, the gating signal may be turned off for a time equal to the occurrence of, say, approximately ten pulses of gating signals after which the gating signals are turned on for another ten successive pulse count. Therefore, by varying the ratio of the time during which gating signals are provided to the SCR relative to the time that gating signals are turned off, proportional power control of the magnetic flux output from the work coil 250-1 may be achieved.

Still a fourth method for obtaining power control of the magnetic flux output, for example, of the work coil 250-1 in the composite inverter 250 is to determine the effective duty cycle of the positive portion of the input power signal across the input terminals 251, 252 over which gating signals are supplied to the SCR 257-1. Thus, for example, if the frequency of the input AC power signal is 60 Hz, and gating signals are provided to the SCR 257-1 approximately 1/240th of a second after the input terminal 251 becomes positive, the effective output power of the magnetic flux generated by the work coil 250-1 is one-half the power that would be generated if gating signals were supplied to the SCR 257-1 as soon as the input terminal 251 became positive and continued during the remainder of that positive going portion. This method of power control may be effected using a conventional ramp signal generator and comparator which has a variable voltage input. When the ramp signal exceeds the voltage of the comparator variable input, the comparator will produce an output signal that may be combined, for example, in a logic gate with the gating signals to provide the same to the SCR 257-1.

The foregoing power control methods may be applied to any of the inverters described herein as well as to other inverters.

Figure 26:
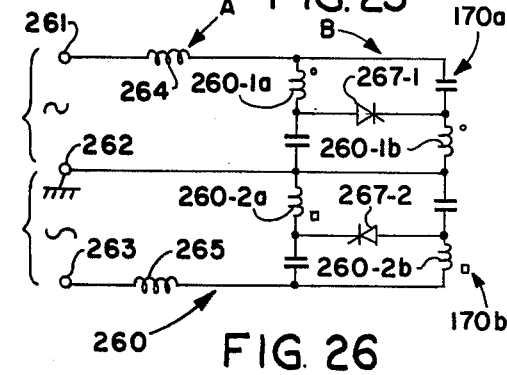

In the composite inverter 260 of FIG. 26 two high frequency inverters 170a, 170b, each of which are identical to the inverter 170 discussed above with respect to FIG. 17, receive input power from the three wires normally provided to a home at the input terminals 261, 262, 263, and the AC power signal supplied between the hot terminal 261 and the neutral terminal 262, for example, at 110 volts, is 180° out of phase with respect to the AC power signal supplied between the neutral terminal 262 and the hot terminal 263. A pair of relatively large input inductors 264, 265 are provided between the respective hot terminals 261, 263 and the respective high frequency inverters 170a, 170b. Moreover, the neutral terminal 262 is connected to a junction 265 of the two high frequency inverters. Two split, bifilar wound, respectively mutually inductively coupled work coil halves 260-1a, 260-1b and 260-2a, 260-2b may be respectively energized by gating signals supplied to the respective SCR's 267-1, 267-2, depending on the polarity of the input power signal to the respective high frequency inverters 170a, 170b exactly in the manner described above with reference to the inverter 170 of FIG. 17. It is noted that the frequencies at which gating signals are supplied to the respective SCR's may be independent of each other.

Figure 27:
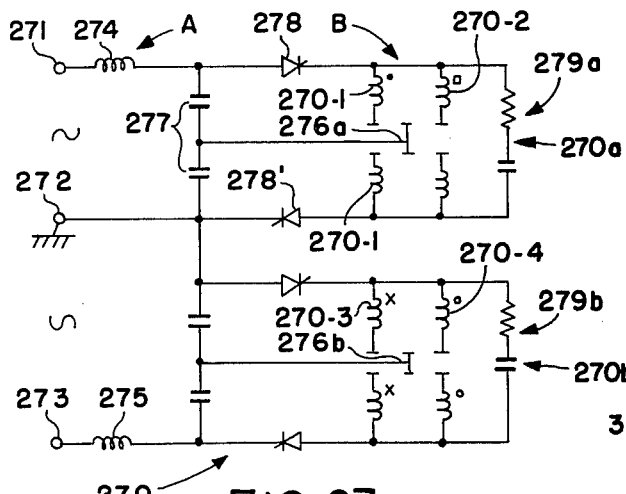

Turning now more particularly to FIG. 27, a composite inverter 270 includes upper and lower portions 270a, 270b, which are respectively energized by 180° out of phase input AC power signals supplied, respectively, across the hot input terminal 271 and the neutral input terminal 272 and across the neutral terminal 272 and hot terminal 273. The relatively large input inductors 274, 275 are connected between the respective hot input terminals 271, 273 and the inverter portions 270a, 270b. Moreover, a pair of mechanical multiplexing switches generally indicated at 276a, 276b provide for selective multiplexing or time sharing of several split, bifilar wound, respectively mutually inductively coupled work coils 270-1 through 270-4 for respective energization to generate a magnetic flux that may be used to provide induction heating at four burners of a domestic cooking appliance. The multiplexing switches may each be, for example, a mechanical switch which provides a connection, for example, between two terminals to which the two respective halves of a divided work coil, such as the work coil 270-1, are connected, and to connect the same as a center tap thereof to the junction of the two capacitors 277, which in combination with the two SCR's 278, 278' form a high frequency inverter which is identical to the inverter 20 described above with reference to FIG. 2.

Thus, when the multiplexing switch 276a is in connection with the two halves of the work coil 270-1, those two halves may be energized in the manner described above with reference to the inverter 20 of FIG. 2. When the multiplexing switch is operated in a cyclical manner, it may be relatively rapidly moved to provide alternately a connection at the two terminals of the two halves of the work coil 270-1 and then to make a connection at the two terminals of the two halves of the work coil 270-2. Similar operation may be effected in the inverter portion 270b of the composite inverter 270. Moreover, respective RC snubber circuits 279a, 279b may be coupled as indicated for dv/dt protection of corresponding pairs of SCR's.

Figure 28:
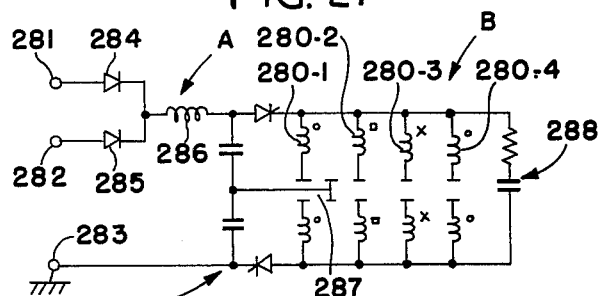

The composite inverter 280 in FIG. 28 is a further multiplexed modification of the inverter 20 described above with reference to FIG. 2. The composite inverter 280 has two hot input terminal 281, 282 across which respective 180° out of phase AC power signals are supplied with respect to the neutral input terminal 283. A pair of diodes 284, 285 provide rectification of the input power signals so that an effectively full wave rectified AC power signal is provided to the large input inductor 286 which is connected to the high frequency circuit portion B of the composite inverter 280. A mechanical multiplexing switch 287, such as the multiplexing switch described above in the composite inverter 270 of FIG. 27, provides an effective center tap connection at each of the respective halves of the split, bifilar wound, respectively mutually inductively coupled work coils 280-1 through 280-4.

When the multiplexing switch 287 provides a connection at the two terminals of the halves of the work coil 280-1 the effective circuit formed is identical with that of the inverter 20 described above with reference to FIG. 2, and operation thereof to effect a magnetic flux output from the work coil 280-1 is identical with that described above. Preferably, the multiplexing switch 287 is moved to break the connection provided at one work coil and to provide a connection at the two halves of another work coil whenever the voltage appearing at the left hand side of the input inductor 286 goes to zero, i.e. at each polarity reversal of the input power signals, although the frequency at which the multiplexing switch 287 is moved or adjusted may be selectively variable. Moreover, a control, not shown, may be used to determine whether the multiplexing switch 287 is to provide connections to the halves of one or as many as all four of the work coils of the composite inverter 280. A conventional RC snubber circuit 288 is connected across the composite inverter 280 as illustrated to provide dv/dt protection for the two SCR's thereof. An advantage of the instant composite inverter is that four work coils used, for example as heating elements, may be energized, respectively, while sharing a pair of capacitors, a pair of SCR's and a single relatively large input inductor.

Figure 29:
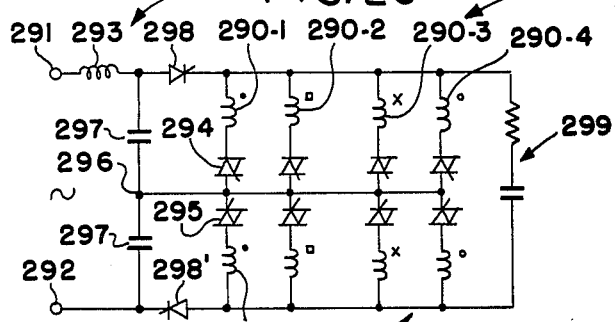

Turning now more particularly to FIG. 29, the composite inverter 290 includes a pair of input terminal 291, 292 across which an AC power signal is supplied, and a relatively large input inductor 293 is connected between the input terminal 291 and the high frequency circuit portion of the composite inverter. Four split, bifilar wound, respectively mutually inductively coupled work coils 290-1 through 290-4, are connected by respective triacs, such as the triacs 294, 295 to a common connection 296, which is connected to the junction of a pair of capacitors 297. The composite inverter 290 also includes a pair of SCR's 298, 298' and an RC snubber circuit 299 is connected across the two SCR's for dv/dt protection thereof.

Assuming that gating signals are provided to both of the triacs 294, 295, the two halves of the work coil 290-1 effectively form a center tap work coil which is connected at its center tap to the junction of the two capacitors 297, and the effective or equivalent circuit is thus identical to the inverter 20 described above with reference to FIG. 2; and operation thereof to effect generation of a magnetic flux output signal by the work coil 290-1 is also the same.

An advantage to the instant composite inverter 290 is that once the triacs 294, 295 are turned on by appropriate gating signals when the input terminal 291 is positive with respect to the input terminal 292, the triacs, which usually have relatively slow switching frequency capability, will remain on until the polarity of the input power signal reverses, at which time the triacs will automatically commutate off. Thereafter, when the input power signal again goes positive, such that the input terminal 291 is positive with respect to the input terminal 292, a further gating signal to the triacs coupled to the halves of the work coil 290-2 may be used effectively to turn on such work coil for energization by high frequency signals generated as gating signals are supplied at a high frequency to the SCR 298, 298'. It is also noted that the three wire input power configuration used in the composite inverter 280 to provide effectively full wave rectified power to the large input inductor 293 may also be used in the instant composite inverter 290, and in such modified form the operation of the inverter 290 would be as above-described, for the pair of conductive triacs still will commutate off each time the effective input power signal goes to zero.

Figure 30:
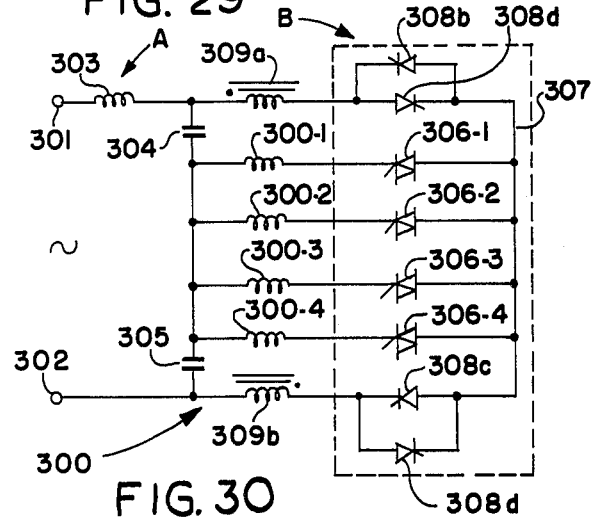

Referring now more particularly to FIG. 30, the composite inverter 300 includes input power terminals 301, 302, across which an AC power signal is supplied, and a relatively large input inductor 303, which provides a constant current to charge the capacitors 304, 305. Four single wound work coils 300-1 through 300-4 are connected at one side to the junction of the two capacitors 304, 305 and at the other sides thereof to respective triacs 306-1 through 306-4, which are located on a common heat sink, as is indicated by the dotted outline in the figure, and which are connected to a common bus 307. Two pairs of back-to-back SCR's 308a, 308b and 308c, 308d are also connected between the common bus 307 and to one side of respective halves of a mutually inductively coupled transformer 309a, 309b. The SCR's are also located on the common heat sink.

In operation of the composite inverter 300, assuming that the input power signal is relatively positive at the input terminal 301 and that the triac 306-1 is supplied with a gating signal, alternate high frequency gating signals supplied to the respective SCR's 308a, 308c will provide for circuit operation to effect energization of the work coil 300-1 in the manner described above with reference to the inverter 80 illustrated in FIG. 8. If continued operation of the work coil 300-1 is desired after the AC power signal reverses polarity such that the input terminal 301 is negative with respect to the input terminal 302, a further gating signal to the triac 306-1, which was commutated off when the input power signal reversed polarity, will effect conduction in the triac, and a supply of high frequency gating signals to the SCR's 308b, 308d, will continue to effect energization of the work coil 300-1 during that negative portion of the input power signal. The transformer 309a, 309b is used to provide commutation voltage to the other SCR's and is useful when operation at higher frequency is required and the SCR's have a relatively long turn off time.

Thus, for example, in operation of the composite inverter 300 to effect sequential energization of the four work coils, which may be four respective heating elements of a range appliance, during the first positive going portion of the input power signal the triac 306-1 will be made conductive and during the first negative going portion of the input power signal the triac 306-2 will be made conductive. Moreover, during the second positive going portion of the input power signal the triac 306-3 will be made conductive and during the second negative going portion of the input power signal the triac 306-4 will be made conductive. Moreover, if desired, only a single pair of SCR's 308a, 308c may be used to provide for selective energization of the respective work coils 300-1 through 300-4 upon each respective succeeding positive going portions of the input power signal, or, of course, if rectified AC or DC power signals are supplied.

Figure 31:
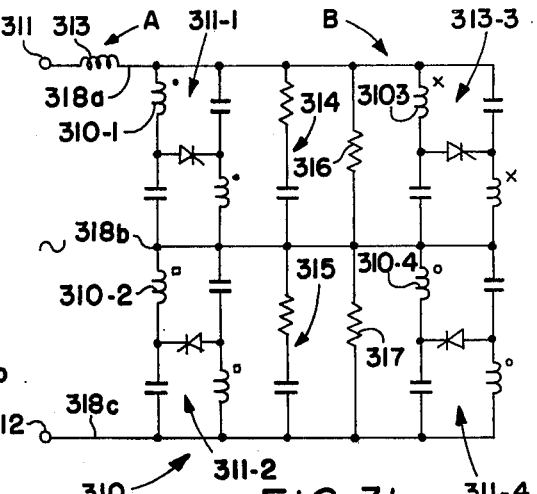
Figure 32:
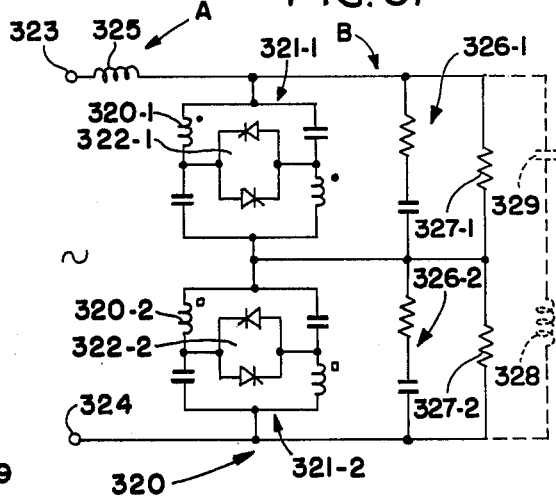

The composite inverters 310 and 320 illustrated, respectively, in FIGS. 31 and 32, are variations of the inverter 170 described in detail above with respect to FIG. 17. In the composite inverter 310 four respective high frequency inverters 311-1 through 311-4 include respective capacitors and SCR's that are selectively fired by supplied gating signals to effect energization of respective split, bifilar wound, respectively mutually inductively coupled work coils 310-1 through 310-4. An AC input power signal is provided to the input terminals 311, 312, and a large input inductor 313 provides constant current to the respective high frequency inverters thereof. Moreover, a pair of snubber circuits 314, 315 provide for dv/dt protection for two respective SCR's and a pair of voltage equalizing resistors 316, 317 are connected between respective busses 318a, 318b, 318c as illustrated.

In operation of the composite inverter 310, gating signals may be supplied to either one of the SCR's in the inverter circuits 311-1, 311-3 whenever the upper input terminal 311 is positive to effect conduction either in the work coil 310-1 or in the work coil 310-3. Moreover, whenever the input terminal 311 is negative relative to the lower input terminal 312, gating signals supplied to either one of the SCR's in the inverters 311-2, 311-4 will effect high frequency energization of either one of the work coils 310-2 or 310-4. If it is desired to operate all four work coils at the same power level, gating signals may be provided to the SCR in the first inverter 311-1 when the upper input terminal is first positive and then to the SCR in the inverter 311-2 when the input power signal goes negative. When the input power signal is again positive, gating signals may be supplied to the SCR in the inverter 311-3 and when the power signal again goes negative gating signals to the SCR in the inverter 311-4 will effect energization of the work coil 310-4. Thus, in every two full cycles of the full wave of the power signal, all four work coils may be respectively energized. Alternatively, during the positive portion of the input power signal, the gating signals may be supplied part of the time to the SCR in the inverter 311-1 and part of the time to the SCR in the inverter 311-3, and similar control may be provided for the SCR's in the inverters 311-2, 311-4 when the input power signal goes negative.

The composite inverter 320 in FIG. 32 comprises a pair of high frequency inverters 321-1, 321-2, each of which includes a pair of back-to-back SCR's 322-1, 322-2, connected in the diagonal arm of a high frequency bridge circuit portion B which may be supplied with respective gating signals to effect energization of respective halves of two split, bifilar wound respectively mutually inductively coupled work coils 320-1, 320-2. Each of the inverters 321-1, 321-2 is identical to the inverter 170 described above with reference to FIG. 17 with the back-to-back configuration included in the dotted outline modification thereof, and operation of each respective inverter is exactly as described above with reference to the inverter 170.

AC input power is supplied to the input terminals 323, 324 of the composite inverter 320, and a large input inductor 325 is connected in at least one of the input lines thereto to provide a constant current supply for charging the respective capacitors in the inverters 321-1, 321-2. Moreover, two RC snubber circuit 326-1, 326-2 and a pair of voltage equalizing resistors 327-1, 327-2 are connected in parallel with the respective snubber circuits and with the inverters 321-1, and 321-2 to equalize the voltage between the same when only one such inverter is operating.

In operation of the composite inverter 320 when the input terminal 323 is relatively positive, the input inductor 325 supplies a constant current to charge the capacitors in both of the inverters 321-1, 321-2. Gating signals may then be applied to the forward facing SCR's in the respective inverters 321-1, 321-2 to effect high frequency energization of the respective work coils 320-1, 320-2 thereof. When the input power signal reverses polarity, gating signals may be applied to the SCR's facing in the other direction.

The composite inverter 320 may be further modified by substituting pure inductors for each of the work coil halves 320-1, 320-2 and then AC coupling a further inductive work coil 328 across opposed normally out of phase sides or nodes of the composite inverter 320 through a capacitor 329. Such circuit arrangement will provide for wide range of control of the driving signal wave form that is supplied to the work coil 328, and the driving signal may be provided over the full wave of the input power signal.

Figure 33:
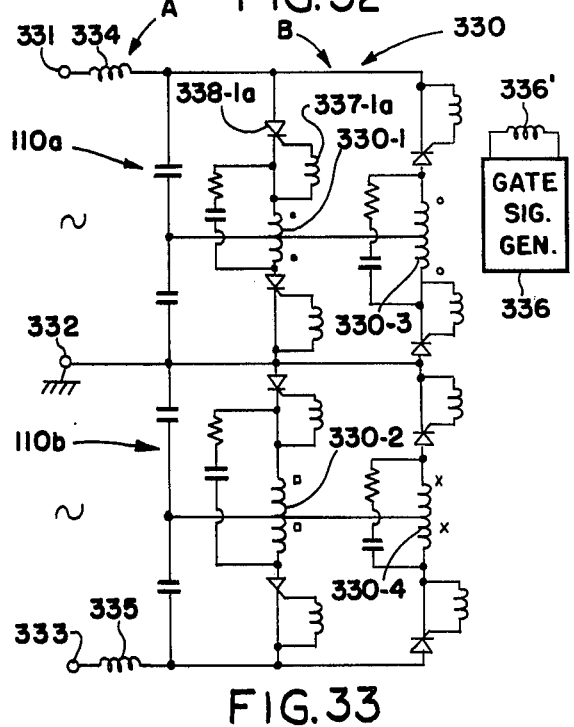

Turning now more particularly to FIG. 33, a composite inverter 330, which includes upper and lower halves 110a, 110b, each of which is identical to the inverter 110 described above with reference to FIG. 11, is supplied with two 180° out of phase input power signals, respectively, between the hot input terminal 331 and neutral input terminal 332 and between neutral terminal 332 and the hot input terminal 333 from a conventional three wire 220 volt power supply to a home. Large input inductors 334, 335 are coupled in respective hot lines to the respective upper and lower halves 110a, 110b of the composite inverter 330.

A gating signal generator, which is a conventional device that generates gating signals usually in the form of pulses that are supplied to pulse transformer primaries, one being illustrated and designated 336', which are inductively coupled to respective pulse transformer secondary, such as secondary 337-1a, connected to the gating terminals of each of the SCR's, such as SCR 338-1a, in the composite inverter 330 is generally indicated at 336. The gating signal generator 336 may include as many as eight respective pulse transformer primaries which may be individually controlled to provide at respective frequencies gating signals to each of the pulse transformer secondaries illustrated in the composite inverter 330, or, for example, the gating signal generator 336 may have a fewer number of pulse transformer primaries, each of which may provide gating signals to more than one pulse transformer secondary to effect conduction in respective SCR's, depending on the polarity of the AC power signal at the input terminals 331, 332, 333. Ultimately, however, the composite inverter 330 provides for the simultaneous and/or selective and individual high frequency energization of the several bifilar wound, center tapped, respectively mutually inductively coupled work coils 330-1 through 330-4, each of which may represent one burner of a four burner cooking appliance.

In operation of the upper half 110a of the composite inverter 330, when the input terminal 331 is positive with respect to the neutral terminal 332, gating signals to the downwardly facing SCR's will provide high frequency energization of the work coil 330-1, and at the same time in the lower half 110b when the input terminal 333 is negative with respect to the neutral terminal 332 gating signals supplied to the downwardly facing SCR's will effect high frequency energization of the work coil 330-2. When the polarities of the two power signals reverse, the work coils 330-3 and 330-4 may be energized by the provision of gating signals to the respective SCR's coupled thereto in the manner described above with respect to the inverter 110 illustrated in FIG. 11.

Figure 34:
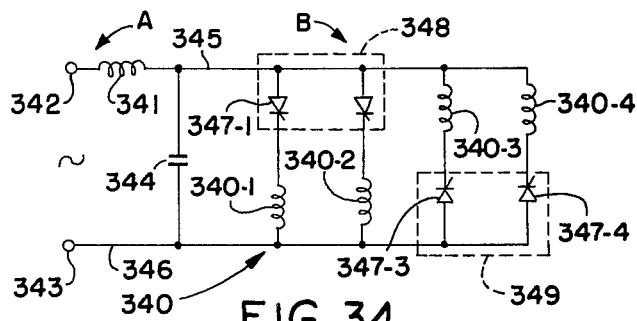

In FIGS. 34 through 38 several variations and modifications of the inverter 160, which is described above with reference to FIG. 16, are illustrated as composite inverter arrangements that provide for multiplexed energization of four respective work coils. Referring initially to FIG. 34, the composite inverter 340 includes a large input inductor 341 and a pair of input terminals 342, 343 to which an AC power signal is supplied. A capacitor 344 is connected between the upper and lower inverter busses 345, 346. Two work coils 340-1, 340-2 are directly connected to the lower circuit bus 346 and are indirectly connected by respective downwardly facing SCR's 347-1, 347-2 to the upper bus 345. Moreover, two more inductive work coils 340-3, 340-4 are directly connected to the upper bus 345 and are indirectly connected to upwardly facing SCR's 347-3, 347-4 to the lower circuit bus 346. The SCR's 347-1, 347-2 are located on a common heat sink 348, and the SCR's 347-3, 347-4 are located on a further common heat sink 349.

In operation of the composite inverter 340 when the input terminal 342 is positive relative to the input terminal 343, gating signals supplied to either one of the SCR's 347-1 or 347-2 will effect energization of respective work coils 340-1 or 340-2 exactly in the manner as described above with respect to the inverter 160. If desired, the work coil 340-1 may be energized during the first positive going portion of the input power signal and the work coil 340-2 may be energized during the next positive going portion of the input power signal, depending on the manner in which gating signals are supplied to the respective SCR's 347-1, 347-2. Moreover, when the polarity of the input power signal reverses such that the lower input signal 343 is positive with respect to the upper input terminals 342, gating signals to the SCR's 347-3 or 347-4 will effect energization of the respective third and fourth work coils 340-3, 340-4. If desired, the work coils 340-3 may be energized during the first negative going portion of the input power signal, and the work coils 340-4 may be energized during the next succeeding negative going portion of the input power signal.

Figure 35:
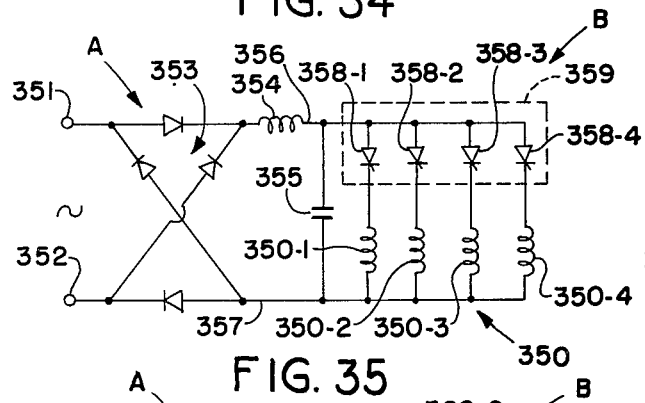

In the composite inverter 350 illustrated in FIG. 35, an AC power signal is provided to the input terminals 351, 352 and that power signal is full wave rectified in a bridge 353 to provide a full wave rectified AC signal to a large input inductor 354. A capacitor 355 is connected between the upper positive and lower negative circuit busses 356, 357. Moreover, four respective work coils 350-1 through 350-4 are directly connected to the negative bus 357 and are each individually connectible through respective SCR's 358-1 through 358-4, which are located on a common heat sink 359, to the positive bus 356. In operation of the inverter 350, the input inductor 354 provides substantially constant current to charge the capacitor 355 such that the upper plate thereof is positive. When a gating signal is applied, say to the SCR 358-1, the first work coil 350-1 is energized in the manner described above with reference to the inverter 160 illustrated in FIG. 16. If a subsequent gating signals is supplied to the SCR 358-2, the second work coil 350-2 will be similarly energized, and so on. One preferred method for sequentially energizing each of the work coils 350-1 through 350-4 would be to provide gating signals to the first SCR 358-1 during the first pulse or portion of the input power signals, to provide gating signals to the second SCR 358-2 during the second pulse or portion of the input power signal, and so on.

Figure 36:
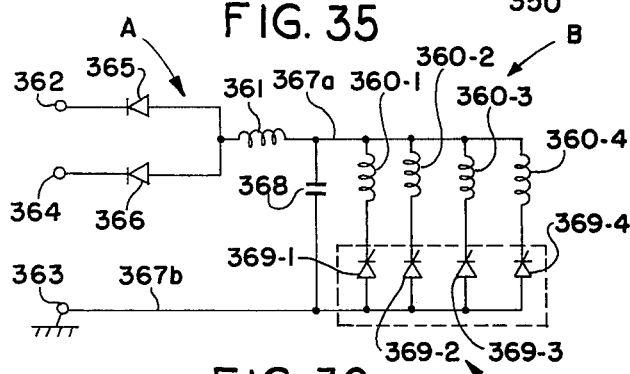

A further composite inverter 360 is illustrated in FIG. 36 and is provided with effectively full wave rectified input power to the large input inductor 361 by a three wire 220 volt power supply normally provided to a home in which the power signal across the hot input terminal 362 and the neutral input terminal 363 is 180° out of phase with respect to the power signal supplied between the hot input terminal 364 and the neutral input terminal 363. The diodes 365, 366 provide rectification for the input power signals so that the composite inverter 360 has effectively an upper negative bus 367a and a lower neutral bus 367b. A capacitor 368 is connected across the negative and neutral busses, and four work coils 360-1 through 360-4 are each directly connected to the negative bus 367a and indirectly connected by respective upwardly facing SCR's 369-1 through 369-4, which are located on a common heat sink indicated by the dotted outline to the negative bus 367b. Operation of the composite inverter 360 may be as described above with reference to the inverter 350 illustrated in FIG. 35. An advantage to the instant circuit configuration is that each of the SCR's may be located on a common heat sink which may be in turn directly connected to the neutral power terminal 363.

Figure 37:
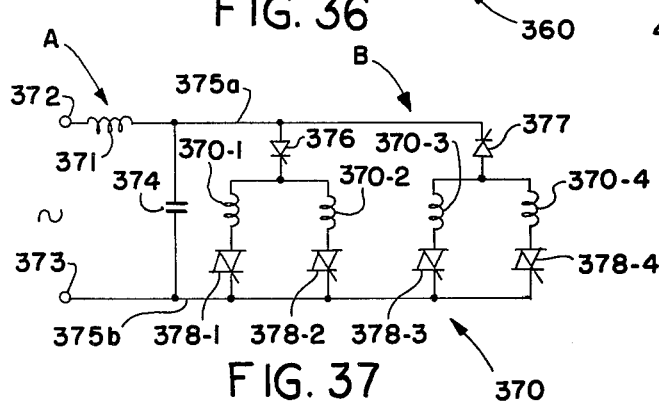

Referring now more particularly to FIG. 37, a composite inverter 370 includes a large input inductor 371 and a pair of input terminals 372, 373 across which an AC power signal is supplied. A capacitor 374 is connected between the upper and lower circuit busses 375a, 375b and a pair of SCR's 376, 377, which face in opposite directions, are also connected to the upper bus 375a. Four work coils 370-1 through 370-4 are respectively connected by triacs 378-1 through 378-4 to the lower circuit bus 375b, and the work coils 370-1, 370-2 are connected to the first SCR 376 and the work coils 370-3, 370-4 are connected to the second SCR 377.

In operation of the composite inverter 370, assuming that the first triac 378-1 is supplied with a gating signal and the upper input terminal 372 is positive with respect to the input terminal 373, gating signals supplied to the SCR 376 will provide high frequency energization of the first work coil 370-1. Since the triac 378-1 requires a relatively long turn off time, it will not turn off during individual firings of the SCR 376; however, when the polarity of the input power signal reverses, the triac 378-1 will commutate off. Thereafter, one of the triacs 370-3, 370-4 may be provided with a gating signal and high frequency gating signals supplied to the SCR 377 will effect high frequency energization of the appropriate work coil 370-3 or 370-4. When the input power signal again reverses polarity, the triac 378-3 or 378-4, which was conducting, will commutate off; and a further gating signal to one of the triacs 378-1, 378-2 as well as appropriate high frequency gating signals to the SCR 376 will provide for energization of one of the work coils 378-1, 378-2. An advantage to the instant composite inverter 370 is that only two high frequency switching SCR's are required relative to the arrangements disclosed in FIGS. 34, 35, 36. Moreover, advantage is taken of the inertia or slow switching frequency of the respective triacs.

Figure 38:
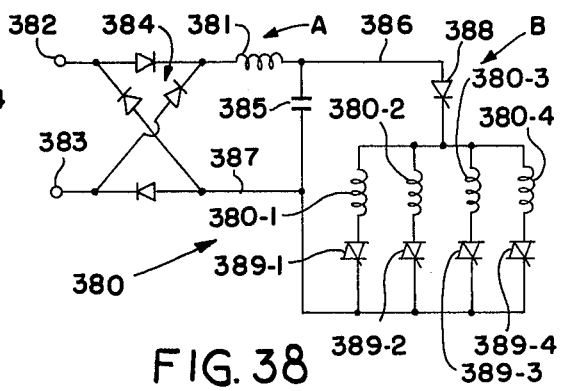

The composite inverter 380 illustrated in FIG. 38 is a still further modification of the inverter 160 described above with reference to FIG. 16 and includes a large input inductor 381, which is supplied with full wave rectified AC power from the input power terminals 382, 383 via a full wave rectifier bridge 384. A capacitor 385 is coupled across the positive and negative circuit busses 386, 387 and the anode of a single SCR 388 is directly connected to the positive bus. Moreover, the cathode of the SCR 388 is connected to four parallel circuits, each of which includes a respective work coil 380-1 through 380-4, which may be respective heating elements of a range appliance, and respective triacs 389-1 through 389-4.

In operation of the composite inverter 380, when the first triac 389-1 is supplied with a gating signal to turn the same on and high frequency gating signals are supplied to the SCR 388, high frequency energization of the first wrok coil 380-1 will occur. When the voltage at the left hand side of the input inductor 381 goes to zero, the triac 389-1 will commutate off, and a gating signal to the same or to another triac will provide for energization of a respective one of the work coils when high frequency gating signals are also supplied to the SCR 388. An advantage to the instant composite inverter 380 is that only a single SCR is required, and advantage is taken of the slow switching frequency of the triacs to effect multiplexed operation of the four work coils using a single capacitor 385 and a single large input inductor 381.

Figure 39:
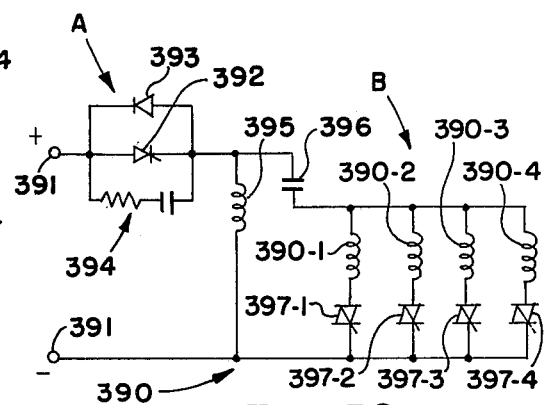

A voltage fed composite inverter 390 in FIG. 39 is supplied with a DC voltage at the input terminal 391. The voltage is supplied through an SCR 392 across which an anti-parallel diode 393 is connected and across which a convention RC snubber circuit 394 is also connected. A relatively large inductor 395 is connected in parallel with a capacitor 396, which may be connected in series with one of a plurality of work coils 390-1 through 390-4, as determined by gating signals supplied to respective triacs 397-1 through 397-4.

In operation of the composite inverter 390, a gating signal to the SCR 392 when the triac 397-1 is gated to conduction, will fire the same to conduction to charge the capacitor 396 through the work coil 390-1, such that the upper capacitor plate becomes positive. When the current in the LC ringing circuit, which includes the energized work coil 390-1 and capacitor 396, rings back or reverses and flows through the anti-parallel diode 393 back into the supply terminal 391 the SCR 392 will be cut off by the voltage drop across diode 393. The current flowing in inductor 395 will now charge the capacitor 396 through the triac and work coil. Subsequent gating signals to the SCR will effect further cyclical operation of the circuit. A more detailed description of the flowing currents during energization of a respective work coil of the composite inverter 390 may be found in U.S. Pat. No. 3,637,970, which discloses a similar single work coil inverter without the improvement of the diode 393.

When the gating signal to the triac 397-1 in the composite inverter 390 is removed and/or gating signals to the SCR 392 are interrupted for a period of time sufficient to allow the triac 397-1 to commutate off, a gating signal to a further triac, such as the triac 397-2, will permit energization of the second work coil 390-2 upon application of further high frequency gating signals to the SCR 392, and so on.

Figure 40:
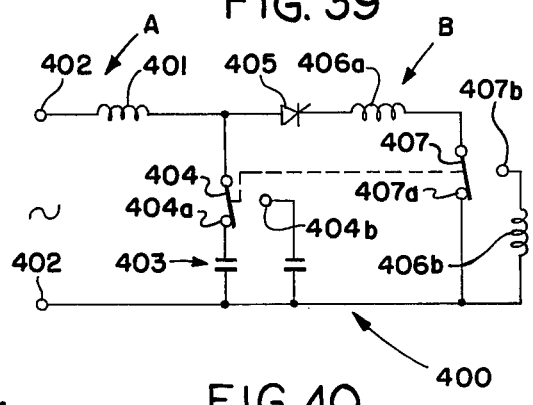
FIG. 40 is a high frequency inverter which includes an adjustable size inductive work coil.

Turning to FIG. 40, the inverter 400 includes a low frequency circuit portion A, which comprises a large input inductor 401 and a pair of input terminals 402 to which an AC power signal is supplied, and a high frequency circuit portion B. The high frequency circuit portion B includes a variable capacitor 403, which includes two parallel capacitors of different capacitance that may be individually inserted into the circuit depending on the position of a selector switch 404, an SCR 405, and a variable inductive work coil, which includes two individual portions 406a, 406b. A further selector switch 407, which is ganged to the first selector switch 404, may be adjusted to a first in connection with contact 407a position to connect only the inductive work coil half 406a in the circuit or to a second position in connection with contact 407b to connect both work coil halves 406a, 406b in series in the circuit. Preferably the work coil half 406a represents the inner half, say three or four inches of diameter, of a spiral shape pancake type inductive work coil having a total diameter over its face of six to eight inches, for example, which is known in the art, and the work coil half 406b represents the outer half of the total work coil, say generally in the form of a three or four inch wide annular ring.

Figure 16:
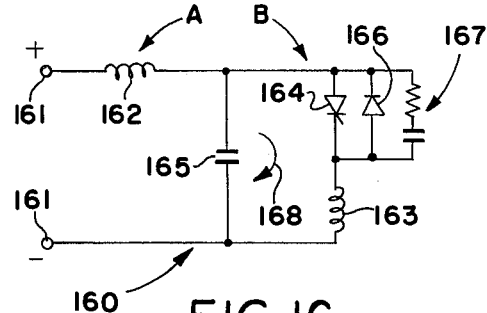

In operation of the inverter 400 for low power output, the switches 404, 407 are connected as shown respectively to contacts 404a and 407a, and the work coil half 406a generates a magnetic flux output, when the input power signal is positive and gating signals are supplied to the SCR 405, in the manner described above with reference to the inverter 160 illustrated in FIG. 16. Magnetic flux will only issue at this time from the central half of the work coil. For high power output, however, the switches 404, 407 are moved to their second positions or connections with respective contacts 404b and 407b and magnetic flux will be generated over the entire face of the pancake work coil. Of course when the two work coil halves are in series their respective inductances are additive; therefore, in order to maintain a constant resonant or ringing frequency, which is porportional to the inverse of the square root of the product of the inductance and capacitance, in the LC circuit, including the work coil and capacitor, the effective size of the capacitor must be varied in accordance with the variation in the effective size of the work coil.

The embodiments of the invention in which an exclusive property or privilege is claimed are defined as follows:

1. A cooking appliance, comprising an inductive heating element for inductively heating a magnetically responsive utensil positioned over an electrically non-conductive gap away from said inductive heating element; and high frequency current fed inverter means for generating directly from a relatively low frequency AC power input signal high frequency electric signals to energize said inductive heating element whereby the latter produces a magnetic flux output signal for effecting inductive heating of such magnetically responsive utensil; said high frequency current fed inverter means comprising a low frequency circuit portion and a high frequency circuit portion, the latter comprising a bridge circuit having four side arms and a diagonal arm; said low frequency circuit portion comprising input means for receiving such AC power input signal, and a relatively large input inductor having a magnitude of inductance such that said input inductor appears as a relatively low impedance to such AC power input signal and as a relatively high impedance to high frequency signals in said high frequency circuit portion thereby to reduce feedback of such high frequency signals to said input means and the sources of such AC power input signal; said high frequency circuit portion being coupled to said low frequency circuit portion and comprising at least one inductor, at least one capacitor, and high frequency switch means for periodically connecting said at least one inductor and said at least one capacitor in a high frequency LC resonant circuit in response to high frequency gating signals supplied to said high frequency switch means to close the same, said input inductor in said low frequency circuit portion being coupled to said high frequency circuit portion and further having a magnitude of inductance to provide relatively constant current during respective cycles of such high frequency signals to charge said at least one capacitor when said high frequency switch means is open, said at least one capacitor being coupled relative to said high frequency switch means and said at least one inductor for supplying a high frequency discharge current through said at least one inductor when said high frequency switch means is closed, and said high frequency switch means being coupled to said at least one capacitor and said at least one inductor to receive the reverse resonant current and voltage in said high frequency LC resonant circuit to effect cut off and opening of said high frequency switch means.

2. A cooking appliance as set forth in claim 1, said input means comprising input terminals, and said bridge circuit comprising two opposed nodes at which power is supplied to said bridge circuit, at least one of said nodes being coupled through said input inductor to one of said input terminals, two of said bridge circuit side arms being connected in series between said two nodes on one side of said bridge circuit and the other two of said side arms being connected in series between said two nodes on the other side of said bridge circuit.

3. A cooking appliance as set forth in claim 2, said diagonal arm of said bridge circuit being connected to the junction of two of said side arms on one side of said bridge circuit and to the junction of two of said side arms on the other side of said bridge circuit.

4. A cooking appliance as set forth in claim 3, said high frequency switch means comprising two SCR's, each being connected in diagonally opposed side arms of said bridge circuit.

5. A cooking appliance as set forth in claim 4, said SCR's being connected facing in opposite directions to conduct current in opposite directions between said nodes.

6. A cooking appliance as set forth in claim 5, wherein said at least one capacitor is connected in said bridge circuit diagonal arm, and there are two of said inductors, each being connected in a respective one of the remaining diagonally opposed side arms of said bridge circuit.

7. A cooking appliance as set forth in claim 6, wherein there are two of said inductive heating elements, each being positioned in the cooking appliance for inductively heating respective magnetically responsive cooking utensils, said inductive heating elements forming at least part of said two inductors, respectively.

8. A cooking appliance as set forth in claim 2, said diagonal arm of said bridge circuit being connected to the junction of two side arms on one side of said bridge circuit and to the junction of two side arms on the other side of said bridge circuit, and said high frequency switch means comprising at least one SCR connected in said bridge circuit diagonal arm.

9. A cooking appliance as set forth in claim 8, said at least one capacitor comprising a pair of capacitors, each being connected in a respective diagonally opposed side arm of said bridge circuit, and said at least one inductor comprising a pair of inductors, each connected in a respective one of the remaining diagonally opposed side arms of said bridge circuit.

10. A cooking appliance as set forth in claim 1, wherein said input means comprises a pair of input terminals, said high frequency circuit portion comprising first and second bridge circuits; each of said bridge circuits having a first node connected to receive power from a respective input terminal and a common connected second node, first and second series connected pairs of side arms, each of said pairs of side arms being connected between said nodes and in parallel with respect to each other, and a diagonal arm connected between the junction of the two side arms of said first pair and the junction of the two side arms of said second pair; said at least one inductor comprising a plurality of inductors, each comprising a first split inductor including two mutually inductively coupled halves respectively connected in diagonally opposed side arms of said first bridge circuit, and a second split inductor including two mutually inductively coupled halves respectively connected in diagonally opposed side arms of said second bridge circuit; said at least one capacitor comprising a first pair of capacitors, each being connected in a respective remaining diagonally opposed side arm of said first bridge circuit, and a second pair of capacitors, each being connected in a respective remaining diagonally opposed side arm of said second bridge circuit; and said high frequency switch means comprising a pair of SCR's, each being connected in the diagonal arm of a respective one of said bridge circuits; and further comprising a pair of voltage equalizing resistors, each being connected in parallel with a respective one of said bridge circuits across the two nodes thereof.

11. A cooking appliance as set forth in claim 10, further comprising a pair of RC snubber circuits, each being connected in parallel with a respective one of said bridge circuits between the two nodes thereof.

12. A cooking appliance as set forth in claim 10, further comprising a third bridge circuit connected in parallel with said first bridge circuit across the two nodes thereof, and a fourth bridge circuit connected in parallel with said second bridge circuit across the two nodes thereof; each of said third and fourth bridge circuits comprising first and second parallel connected pairs of side arms connected between two respective nodes on opposite sides of said bridge circuit and a diagonal arm connected between the junction of the side arms on one side of said bridge circuit and the junction of said side arms on the other side of said bridge circuit, a pair of capacitors, one connected in each of the diagonally opposed side arms of said bridge circuit, an SCR connected in the diagonal arm of said bridge circuit, and a work coil, including two mutually inductively coupled halves, each of which is connected in one of the remaining diagonally opposed side arms of said bridge circuit.

13. A cooking appliance as set forth in claim 12, wherein said SCR's connected in said first and third bridge circuits face in the same direction to conduct current through the respective inductors in said respective bridge circuits in a direction from a first one of said input terminals toward a second one of said input terminals, and said SCR's in said second and fourth bridge circuits face in the same direction to conduct current through the respective work coils in said respective bridge circuits in a direction from said second one of said input terminals toward said first one of said input terminals, and said inductive heating element including a plurality of the same, each being comprised of a respective one of said work coils.

14. A cooking appliance as set forth in claim 4, each of said SCR's being connected facing in the same direction to conduct current in a direction from one of said nodes toward the other of said nodes.

15. A cooking appliance as set forth in claim 14, said inductive heating element comprising an inductive work coil, said at least one capacitor being connected in said bridge circuit diagonal arm, and said at least one inductor comprising two halves of said inductive work coil, each of said halves exhibiting an inductance and generating a magnetic flux output in response to a current therethrough, each of said work coil halves being connected in a respective one of the remaining diagonally opposed side arms of said bridge circuit, and said work coil halves being mutually inductively coupled.

16. A cooking appliance as set forth in claim 15, said SCRs being adapted for alternate energization.

17. A cooking appliance, comprising an inductive heating element for inductively heating a magnetically responsive utensil positioned over an electrically nonconductive gap away from said inductive heating element; and high frequency current fed inverter means for generating directly from a relatively low frequency AC power input signal high frequency electric signals to energize said inductive heating element whereby the latter produces a magnetic flux output signal for effecting inductive heating of such magnetically responsive utensil; said high frequency current fed inverter means comprising a low frequency circuit portion and a high frequency circuit portion; said low frequency circuit portion comprising input means for receiving such AC power input signal, and a relatively large input inductor having a magnitude of inductance such that said input inductor appears as a relatively low impedance to such AC power input signal and as a relatively high impedance to high frequency signals in said high frequency circuit portion thereby to reduce feedback of such high frequency signals to said input means and the sources of such AC power input signal; said high frequency circuit portion being coupled to said low frequency circuit portion and comprising at least one inductor, at least one capacitor, and high frequency switch means for periodically connecting said at least one inductor and said at least one capacitor in a high frequency LC resonant circuit in response to high frequency gating signals supplied to said high frequency switch means to close the same, said input inductor in said low frequency circuit portion being coupled to said high frequency circuit portion and further having a magnitude of inductance to provide relatively constant current during respective cycles of such high frequency signals to charge said at least one capacitor when said high frequency switch means is open, said at least one capacitor being coupled relative to said high frequency switch means and said at least one inductor for supplying a high frequency discharge current through said at least one inductor when said high frequency switch means is closed, and said high frequency switch means being coupled to said at least one capacitor and said at least one inductor to receive the reverse resonant current and voltage in said high frequency LC resonant circuit to effect cut off and opening of said high frequency switch means; wherein there are a plurality of said inductive heating elements, each being positioned in the cooking appliance for inductively heating respective magnetically responsive cooking utensils, and said high frequency current fed inverter means includes means for supplying such high frequency electric signals selectively to each of said plurality of inductive heating elements; wherein said input means comprises a first power input terminal and a relatively neutral input terminal across which a first AC power input signal is supplied, and a second power input terminal, said second power input terminal and said neutral input terminal receiving a second AC power input signal such first and second AC power input signals being 180° out of phase with respect to each other; said high frequency circuit portion comprising first and second bridge circuits each having a pair of opposed nodes to which power is supplied from said neutral input terminal and a respective one of said power input terminals, and four side arms and a diagonal arm; and wherein there are a plurality of said inductors, one of said inductors being connected in one arm of one of said bridge circuits and another of said inductors being connected in one arm of the other of said bridge circuits, and there are at least two of said capacitors, one of said capacitors being connected in a second arm of each of said bridge circuits, respectively, and there are a plurality of said high frequency switch means, one of said high frequency switch means being connected in each of said bridge circuits, respectively, for periodically connecting a respective inductor and capacitor in a respective high frequency LC resonant circuit.

18. A cooking appliance as set forth in claim 17, at least one of said nodes of each of said bridge circuits being coupled through said input inductor to an input terminal; and in each of said bridge circuits two of said side arms being series connected between said two nodes on one side of said bridge circuit and two of said side arms being series connected between said two nodes on the other side of said bridge circuit, and said diagonal arm being connected to the junction of said two side arms on one side of said bridge circuit and to the junction of said two side arms on the other side of said bridge circuit.

19. A cooking appliance as set forth in claim 18, in each of said bridge circuits said high frequency switch means comprising two SCR's, each being connected in diagonally opposed side arms of said bridge circuit, said one capacitor being connected in said diagonal arm of said bridge circuit, and there are two of said inductors, each of said inductors being connected in a respective one of the remaining diagonally opposed side arms of said bridge circuit; said inductive heating elements each forming at least part of said inductors, respectively.

20. A cooking appliance as set forth in claim 19, in each of said bridge circuits said SCR's are connected facing in opposite directions to conduct current in opposite directions between said nodes.

21. A cooking appliance as set forth in claim 20, wherein there are two relatively large ones of said input inductors, one of said input inductors being connected between said first power input terminal and one of said nodes of said first bridge circuit and the other of said input inductors being connected between said second power input terminal and one of said nodes of said second bridge circuit.

* * * * *